United States Patent
Aoyama et al.

(10) Patent No.: US 8,817,681 B2
(45) Date of Patent: Aug. 26, 2014

(54) WIRELESS COMMUNICATION APPARATUS AND WIRELESS COMMUNICATION METHOD USING A GAP PATTERN

(75) Inventors: Takahisa Aoyama, Kanagawa (JP); Hong Tat Toh, Singapore (SG); Hong Cheng, Singapore (SG); Benjamin Tien Ming Koh, Singapore (SG); Pek Yew Tan, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 387 days.

(21) Appl. No.: 13/264,901

(22) PCT Filed: Apr. 19, 2010

(86) PCT No.: PCT/JP2010/002823
§ 371 (c)(1),
(2), (4) Date: Oct. 17, 2011

(87) PCT Pub. No.: WO2010/122771
PCT Pub. Date: Oct. 28, 2010

(65) Prior Publication Data
US 2012/0033595 A1    Feb. 9, 2012

(30) Foreign Application Priority Data

Apr. 20, 2009   (JP) ................................. 2009-101958
Jun. 24, 2009   (JP) ................................. 2009-149876

(51) Int. Cl.
*G08C 17/00*   (2006.01)
*H04W 76/04*   (2009.01)
*H04W 52/02*   (2009.01)

(52) U.S. Cl.
CPC ................ *H04W 76/048* (2013.01);
*H04W 52/02* (2013.01)
USPC .......................................... 370/311; 370/241

(58) Field of Classification Search
None
See application file for complete search history.

(56) References Cited

U.S. PATENT DOCUMENTS

| 6,201,966 B1 | 3/2001 | Rinne |
| 7,372,842 B2 | 5/2008 | Kim |
| 2003/0108027 A1 | 6/2003 | Kim |

(Continued)

FOREIGN PATENT DOCUMENTS

| WO | 2008/155912 | 12/2008 |
| WO | WO 2008/155912 A1 * | 12/2008 |

OTHER PUBLICATIONS

International Search Report dated Jul. 6, 2010.

(Continued)

*Primary Examiner* — Kevin C Harper
*Assistant Examiner* — Peter Chen
(74) *Attorney, Agent, or Firm* — Dickinson Wright PLLC

(57) ABSTRACT

A wireless communication terminal apparatus and wireless communication method, wherein the time necessary for implementation of handover is reduced without increasing the complexity of the configuration of the wireless communication terminal apparatus. A gap confirmation unit (105) determines to start the UE-initiated GP at the current DRX cycle in cases when the extended DRX active period is shorter than the UE-initiated GP start offset, and determines to start the UE-initiated GP at the next DRX cycle in cases when the extended DRX active period is longer than the UE-initiated GP start offset. A UE-initiated GP configuration unit (106) generates a gap pattern at the determined DRX cycle.

6 Claims, 22 Drawing Sheets

(56) References Cited

U.S. PATENT DOCUMENTS

| | | | |
|---|---|---|---|
| 2008/0102880 A1* | 5/2008 | Gholmieh et al. | 455/522 |
| 2008/0225772 A1* | 9/2008 | Xu | 370/313 |
| 2008/0268863 A1* | 10/2008 | Pedersen et al. | 455/452.2 |
| 2010/0087197 A1* | 4/2010 | Iwamura et al. | 455/436 |
| 2010/0111019 A1* | 5/2010 | Wu | 370/329 |
| 2010/0113055 A1* | 5/2010 | Iwamura et al. | 455/452.1 |
| 2010/0130214 A1* | 5/2010 | Ahluwalia | 455/450 |
| 2010/0159950 A1 | 6/2010 | Toh | |
| 2010/0190487 A1* | 7/2010 | Wang et al. | 455/423 |
| 2011/0170483 A1* | 7/2011 | Ishii | 370/328 |
| 2011/0199908 A1* | 8/2011 | Dalsgaard et al. | 370/241 |

OTHER PUBLICATIONS

3GPP TSG-RAN WG2#63, "DRX and measurement gap," ZTE, Tdoc R2-083984, Aug. 18-22, 2008, pp. 1-6.

3GPP TSG-RAN2 Meeting #58, "Measurement Gap and DRX interaction," Samsung, Tdoc R2-072038, May 7-11, 2007, pp. 1-3.

3GPP TSG RAN WG2 #60, "Relation between DRX and Gap for Measurement," Panasonic, R2-074856, Nov. 5-9, 2007, pp. 1-3.

3GPP TSG RAN WG2 Ad Hoc on LTE, "Measurement gap control," NTT DoCoMo, Inc., Tdoc-R2-061922, Jun. 27-30, 2006, pp. 1-10.

* cited by examiner

100
WIRELESS COMMUNICATION APPARATUS AND WIRELESS COMMUNICATION METHOD USING A GAP PATTERN

TECHNICAL FIELD

The present invention relates to a radio communication terminal apparatus, radio communication base station apparatus, and radio communication method.

BACKGROUND ART

In a cellular communication system represented by, for example, 3GPP LTE (3rd Generation Partnership Project Long Term Evolution), a mobile station (hereinafter "UE" (user equipment)) is required to perform measurement process in order to perform mobility control such as a handover. This measurement includes intra-frequency measurement, inter-frequency measurement using gaps and inter-system measurement, and a cellular communication system is required to support these measurements. Also, inter-frequency measurement using gaps and inter-system measurement are also referred to as gap-assisted measurement.

To perform gap-assisted measurement, UE is required to receive a signal from another cell with different carrier frequency or from another system, so that UE has to adjust its receiver away from the frequency of the source cell to another carrier frequency or another system of a neighbor cell. For UE to measure a neighbor cell, it is necessary to provide gaps (hereinafter also referred to as "an idle period") to UE.

In order to achieve gap synchronization between a serving base station and UE, explicit start position to activate gaps is configured. Also, gaps are arranged on a periodic basis, and these periodic gaps are referred to as a gap pattern. To perform measurement, this gap pattern needs to be provided over a long period. Therefore, by performing gap-assisted measurement base on the gap pattern arrangement, UE can support mobility control to other carrier frequencies or other systems even during communication. In addition, even during discontinuous reception (DRX), measurement is possible only after gap is activated.

In addition to the above measurement process, gaps are used to receive broadcast information (also referred to as "system information") of a specific cell. Specifically, gaps are also used to identify whether or not it is possible to access the cell called closed subscriber group (CSG) cell where only specific UE can access, by comparing the CSG identifier of this cell that is included in broadcast information and an accessible CSG identifier list that UE has. Since UE cannot receive broadcast information from other cells during communication with a serving base station, UE acquires broadcast information of other cells using gaps.

Meanwhile, by explicit signaling is used to indicate the start of a gap pattern, a delay is expected until UE starts measurement. This is because there are a delay for decision to generate gaps in a base station, and a delay for signaling transmission to indicate the start of a gap pattern.

Therefore, conventionally, the method to measure using DRX without designating gaps by explicit signaling, and the method to start measurement based on a CQI value measured without designating gaps by explicit signaling disclosed in non-patent literature 1 have been considered. In the former method, it is not necessary to provide an explicit gap pattern, so that it enables UE to start measurement earlier.

In the latter method, as disclosed in non-patent literature 1, if the CQI value is lower than the defined threshold or the configured threshold, UE voluntary starts measurement step of using gap. A base station receives CQI reporting that implicitly shows that UE starts measurement and by this means can detect that UE starts measurement.

CITATION LIST

Non-Patent Literature

NPL 1
R2-061922, 3GPP RAN2 document

SUMMARY OF INVENTION

Technical Problem

However, since a DRX sleep period that is a time slot that can be used for measurement is not fixed, the former method cannot guarantee enough time slot for UE to perform measurement. This is because the DRX active period that is a time slot for UE to receive data may be extended, while UE can decode PDCCH properly. Therefore, due to the extension of DRX active period, the DRX sleep period has to be shortened.

Thus, since the time that UE measures within the designated DRX sleep period lessens, it is required to extend the measurement until sufficient slots are acquired. As a result, it takes time to perform a handover.

Meanwhile, in the latter method, the channel quality of UE changes dynamically, so that it is not possible to guarantee a sufficient time slot for UE to perform measurement. Specifically, when UE measures using a long gap pattern, the reported CQI values may suddenly change significantly, and it results in ending or suspending the measurement on the way. By this means, the complexity of UE configuration increases.

It is therefore an object of the present invention to provide a radio communication terminal apparatus, radio communication base station apparatus and radio communication method that shorten the time required to perform handover without increasing constitutional complexity of a radio communication terminal apparatus.

Solution to Problem

The radio communication terminal apparatus of the present invention employs a configuration having: a gap verification section that decides whether to start a gap pattern in the current discontinuous reception cycle or to start the gap pattern in the next discontinuous reception cycle, based on a discontinuous reception active period to receive data and the length of an offset that shows the time from a start of the discontinuous reception active period to a start of the gap pattern; and a gap pattern configuration section that generates the gap pattern in the designated discontinuous reception cycle.

A radio communication method employs a configuration having: a gap verification step of deciding whether to start a gap pattern in the current discontinuous reception cycle or to start the gap pattern in the next discontinuous reception cycle, based on a discontinuous reception active period to receive data and the length of an offset that shows the time from a start of the discontinuous reception active period to a start of the gap pattern; and a gap pattern configuration step where a radio communication terminal apparatus generates the gap pattern in the designated discontinuous reception cycle.

Advantageous Effects of Invention

The present invention can shorten the time for a handover without increasing constitutional complexity of a radio communication terminal apparatus.

DESCRIPTION OF EMBODIMENTS

Figure 1:
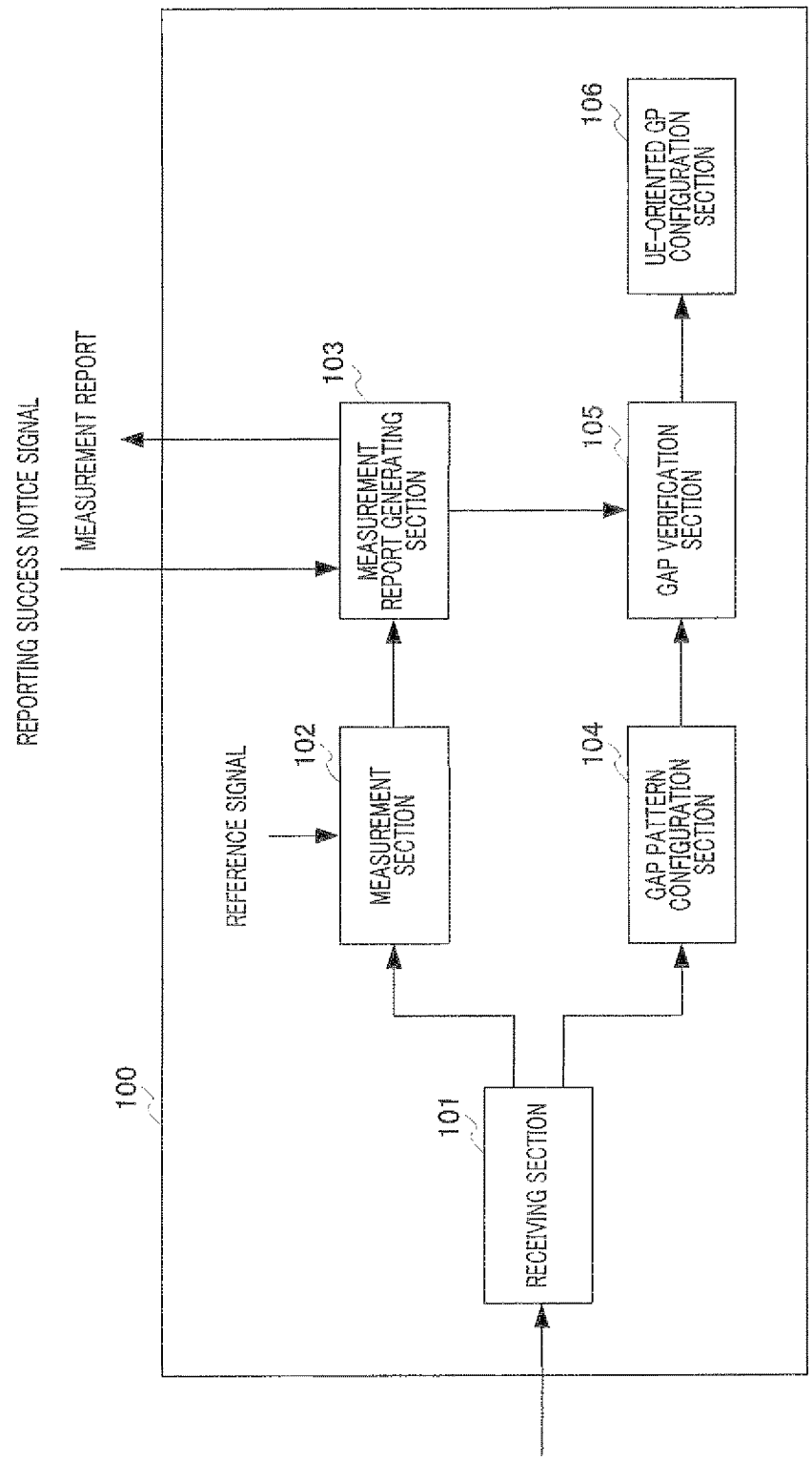
FIG. 1 is a block diagram showing a configuration of UE according to embodiment 1 of the present invention.

Embodiments of the present invention will be described in detail with reference of the accompanying drawings. Here, in embodiments, the configurations having the same functions will be assigned the same reference numerals and their explanations will be omitted.

(Embodiment 1)

FIG. 1 is a block diagram showing a configuration of UE 100 according to embodiment 1 of the present invention. In this diagram, receiving section 101 can receive measurement configuration information and gap pattern configuration information via dedicated control signaling from the network. Measurement configuration information that is included in a RRC connection reconfiguration message as defined in 3GPP TS 36.331 is an example of such signaling. Once receiving these configuration information, receiving section 101 outputs the measurement configuration information to measurement section 102 and outputs the configured gap pattern parameters to gap pattern configuration section 104.

Here, as measurement configuration information, there are, for example, a measurement ID that is an identifier to manage measurement configuration, a measurement object that shows a system, frequency, cells, and so on of a measurement target, and a reporting configuration that defines, for example, an event to report the measurement. As gap pattern configuration information, there are, for example, UE-oriented GP start offset to define the position to start gaps, in addition to the gap pattern information (gap length and gap cycle) for measuring other systems and other carrier frequencies.

After receiving measurement configuration information output from receiving section 101, measurement section 102 stores the acquired measurement configuration information and at the same time starts measurement, based on the input physical layer reference signal (hereinafter simply referred to as "reference signal"). When the measurement configuration information stored in measurement section 102 includes both configuration information of serving carrier frequency and other carrier frequencies (that is, measurement configuration of intra-frequency and inter-frequency defined in 3GPP TS 36.331), measurement section 102 measures based on the input reference signal. Measurement section 102 can perform a cell search step and a measurement step of serving carrier frequency. When the event for serving carrier frequency measurement, that is for the purpose of reporting, is triggered, measurement section 102 outputs the result to measure serving carrier frequency to measurement report generating section 103. "The quality of serving carrier frequency is lower than a specific threshold" and "a CSG cell is detected, so that this requires to receive broadcast information of a CSG cell" and so on are examples of the event here.

Measurement report generating section 103 includes the measuring result output from measurement section 102 in a reporting message and transmits the reporting message to the base station. This reporting message may be referred to as a measurement report or intra-frequency measurement report. When a measurement report is transmitted from UE 100 to the base station properly, measurement report generating section 103 outputs a reporting success notice signal to gap verification section 105.

Gap pattern configuration section 104 stores gap pattern parameters output from receiving section 101 and at the same time outputs the gap pattern parameters to gap verification section 105. It is possible for the gap pattern parameters to be a different form according to operations and configurations of network. As gap pattern parameters, there is UE-oriented gap pattern start offset (hereinafter, "UE-oriented GP") (also referred to as UE-oriented GP start position, UE-oriented GP offset, UE-oriented GP position, or UE-oriented GP activation time) that indicates the time from the start of a DRX active period to the start of UE-oriented GP.

Gap verification section 105 decides the position to activate UE-oriented GP, based on gap pattern parameters output from gap pattern configuration section 104 and a reporting success notice signal output from measurement report generating section 103. This starting position is for UE 100 to start gap to perform measurement Gap verification section 105 decides the position to activate UE-oriented GP, based on a relationship between a DRX active period and UE-oriented GP start offset. UE 100 decides the starting point of UE-oriented GP start offset, based on the starting point of DRX cycle where a measurement report has been properly transmitted to base station 200 (one DRX cycle is formed by one DRX active period and one DRX sleep period following this DRX active period). At the time to transmit the measurement report, UE 100 verifies whether or not the extended DRX active period will end before UE-oriented GP start offset. UE 100 performs the following operation, according to whether or not the extended DRX active period will end before UE-oriented GP start offset.

(1) When the extended DRX active period ends before UE-oriented GP start offset, it is assumed that, in UE 100, the DRX active period will not overlap with UE-oriented GP in the current DRX cycle. Thus, UE 100 activates UE-oriented GP in the current DRX cycle.

(2) When the extended DRX active period ends after UE-oriented GP start offset, it is assumed that, in UE 100, the DRX active period will overlap with UE-oriented GP in the current DRX cycle. Thus, UE 100 activates UE-oriented GP in the next DRX cycle.

As above, gap verification section 105 decides the timing to activate UE-oriented GP and outputs the decided timing to UE-oriented GP configuration section 106.

UE-oriented GP configuration section 106 decides the position to start UE-oriented GP based on the timing output from gap verification section 105, and generates a gap pattern according to the position.

By this means, UE 100 can measure other carrier frequencies of neighbor cells or other systems by using UE-oriented GP. When event criteria of reporting about the measurement of the triggered other carrier frequencies are met, UE 100 transmits the measurement result to base station 200 via a measurement report.

Figure 2:
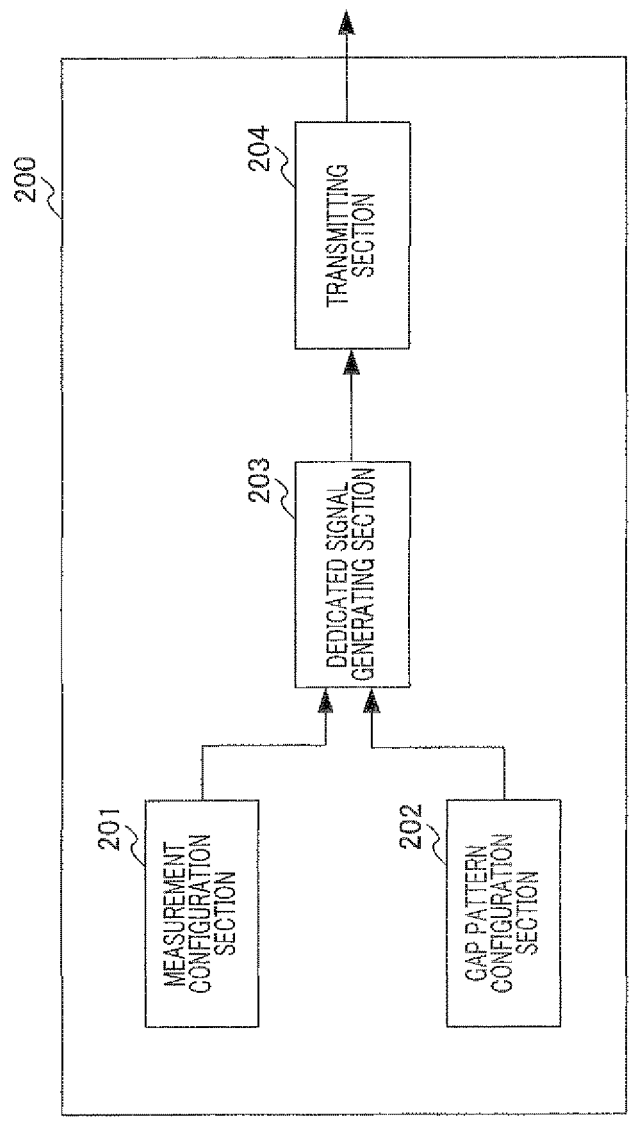
FIG. 2 is a block diagram showing a configuration of the base station according to embodiment 1 of the present invention.

FIG. 2 is a block diagram showing a configuration of base station 200 according to embodiment 1 of the present invention. In this diagram, if it is determined that the measurement about other carrier frequencies or other systems is necessary in UE 100, measurement configuration section 201 decides measurement parameters for inter-frequency measurement or inter-RAT measurement. These measurement parameters are output to dedicated signal generating section 203.

Gap pattern configuration section 202 decides UE-oriented GP start offset based on the configured idle period (that is, the DRX cycle). Since UE-oriented GP start offset is based on the currently provided DRX cycle, the length of UE-oriented GP start offset should not be longer than the provided DRX cycle. UE-oriented GP start offset aims to decide the position where UE 100 can start UE-oriented GP without overlapping with the DRX active period as a result. Gap pattern configuration section 202 outputs UE-oriented GP start offset to dedicated signal generating section 203.

Dedicated signal generating section 203 decides the provided UE-oriented GP start offset and specific UE 100 where measurement information is subject to send, and generates downlink dedicated signaling (which includes measurement configuration information and UE-oriented GP start offset) to this UE 100. This signaling is output to transmitting section 204 and transmitted to UE 100. An example of this downlink dedicated signaling is the measurement configuration information included in a RRC connection reconfiguration message defined in 3GPP TS 36.331.

Figure 3:
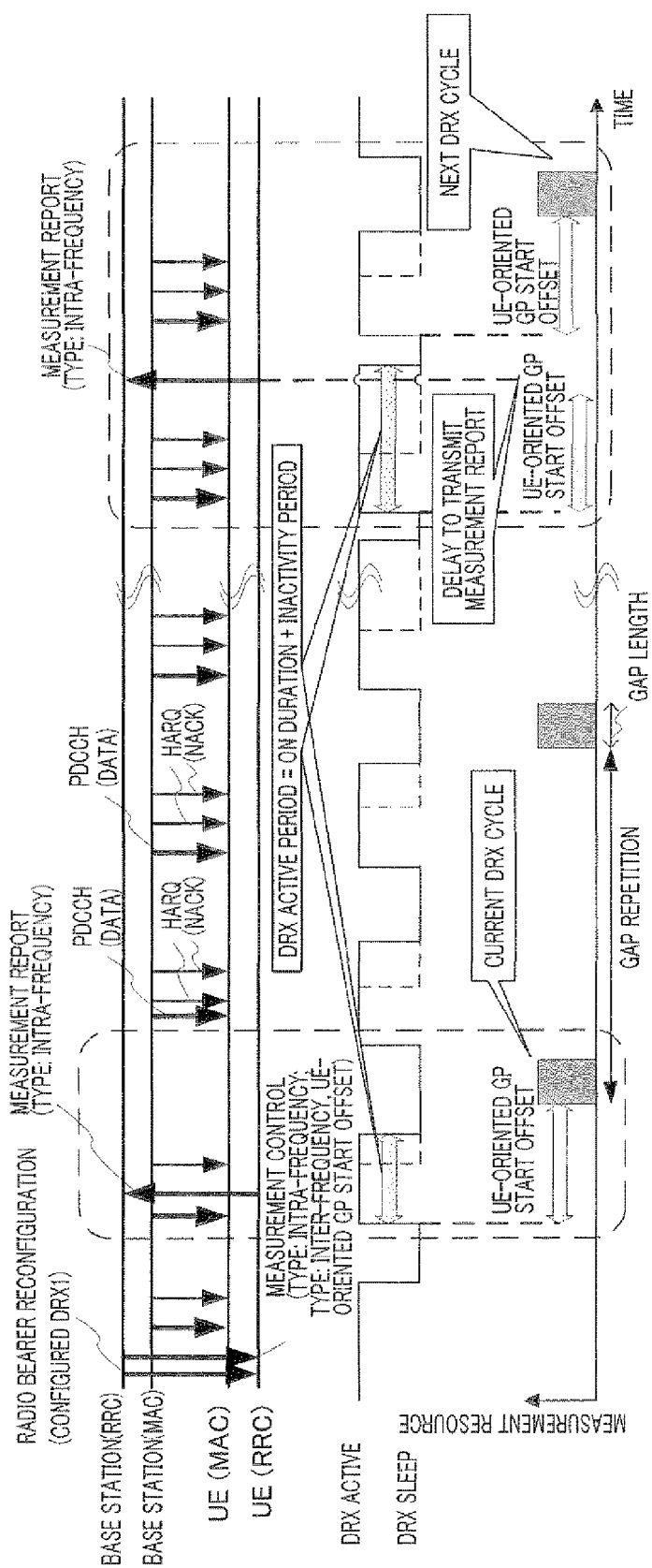
FIG. 3 shows a signaling flow of UE shown in FIG. 1 and a base station shown in FIG. 2.

FIG. 3 shows signaling flow of UE 100 shown in FIG. 1 and base station 200 shown in FIG. 2. At first, a base station configures gap pattern configuration information and measurement configuration information. A base station transmits these configuration information to UE 100. UE 100 receives and processes the configuration information transmitted from base station 200.

When an idle period to measure other carrier frequencies is necessary, UE 100 decides UE-oriented GP configuration based on the gap pattern criteria. Measurement report generating section 103 generates this UE-oriented GP configuration information with a measurement result and transmits to base station 200 through uplink dedicated control signaling (hereinafter "measurement report").

After a measurement report is transmitted to base station 200 properly, UE-oriented GP starts using the provided gap pattern parameters (hereinafter "UE-oriented GP start offset") in gap verification section 105. Gap verification section 105 determines whether or not the activation of UE-oriented GP does not result in overlapping with the data resource arranged within the extended DRX active period. This determination is made by comparing the length of the extended DRX active period and the length of UE-oriented GP start offset.

When a measurement report is transmitted properly and the extended DRX active period ends before the timing indicated by UE-oriented GP start offset, in UE 100, data is considered not to overlap with the measurement, even if UE-oriented GP starts within the current DRX cycle after the timing indicated by UE-oriented GP start offset. Therefore, UE 100 can start the UE-oriented GP just before the DRX-On duration.

When a measurement report is transmitted properly and the extended DRX active period ends after the timing indicated by UE-oriented GP start offset, in UE 100, the DRX active period is possible to overlap with the measurement, even if UE-oriented GP starts after the timing indicated by UE-oriented GP start offset. Therefore, to prevent data and measurement from overlapping, UE 100 starts UE-oriented GP after the timing indicated by UE-oriented GP start offset in the next DRX cycle.

To describe the above operation in detail, in the following example, the section for the UE-oriented GP start offset is based on the number of subframe and the service running in UE 100 is video streaming.

In LTE, a single gap length is adopted for inter-frequency E-UTRA and inter-RAT (3GPP systems).

Gap length=6 subframes;
UE-oriented GP start offset=25 subframes;
DRX cycle=40 subframes;
DRX-On duration=10 subframes;
DRX Inactivity timer=5 subframes;
DRX starting time instant=5th subframe.

If it is decided, based on the quality of UE 100 frequency, that it is necessary to measure other carrier frequencies or other system radio conditions, that is, if the quality of UE 100 frequency deteriorates and the event criteria of reporting are satisfied, UE 100 includes the evaluated measured result in a measurement report message and transmits to base station 200.

In the following example, it is assumed that the extended DRX active period ends and a measurement report has been transmitted already within the same DRX cycle.

Extended DRX active period=DRX starting time instant+DRX-On duration+DRX Inactivity timer=5th+10+5=20th subframe. UE-oriented GP starting time instant=DRX starting time instant+UE-oriented GP start offset=5th+25=30th subframe. Since the extended DRX active period ends before the timing indicated by UE-oriented GP start offset, UE 100 activates UE-oriented GP within the current DRX cycle as illustrated.

Remaining DRX cycle=DRX cycle−UE-oriented GP Activation=40−30=10 subframes. Thus, the remaining DRX cycle (10 subframes) is longer than gap length (6 subframes). Therefore, UE 100 can use UE-oriented GP in the current DRX cycle without overlapping the DRX active period and measurement as a result.

The above method is one way to indicate how to communicate the information (for example, UE-oriented GP start offset) that is necessary between UE 100 and base station 200, and as other methods, it is also possible to use signaling between base station 200 and UE 100 by radio resource control and medium access control (MAC).

Next, the method to use UE-oriented GP start offset based on a trigger of a measurement report will be described using FIG. 4.

Figure 4:
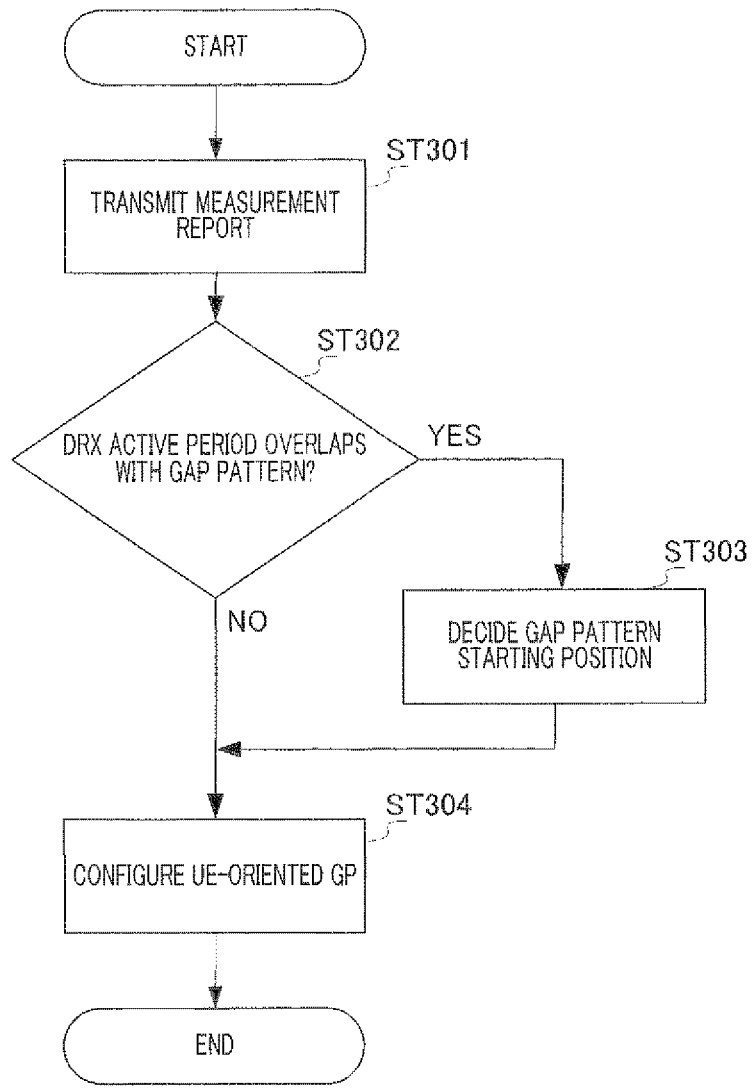
FIG. 4 is a flow diagram showing operation of UE shown in FIG. 1.

FIG. 4 is a flow diagram showing operation of UE 100 shown in FIG. 1. In this diagram, in step (hereinafter abbreviated as "ST") 301, measurement report generating section 103 transmits a measurement report to base station 200.

In ST 302, after measurement is performed properly, gap verification section 105 verifies whether or not the DRX active period overlaps in the case where a gap pattern starts, in checking steps of the DRX active period, using UE-oriented GP start offset. When the DRX active period overlaps with a gap pattern (YES), the step moves to ST 303, and when the DRX active period does not overlap with a gap pattern (NO), the step moves to ST 304.

In step ST 303, gap verification section 105 uses the start position of the next DRX cycle as a benchmark and decides the position to start a gap pattern using the length of UE-oriented GP start offset. In the next DRX cycle, UE 100 starts UE-oriented GP.

In ST 304, UE-oriented GP configuration section 106 starts UE-oriented GP, based on the gap length required for each measurement of, for example, inter-frequency E-UTRA, inter-RAT UTRAN, inter-RAT GERAN or inter-RAT CDMA 2000, and the gap repetition included in UE-oriented GP information parameters (which UE 100 decides based on the criteria for UE-oriented GP).

According to embodiment 1, by starting UE-oriented GP in the current DRX cycle or starting in the next DRX cycle depending on the relationship of length between the extended DRX active period and UE-oriented GP start offset, it is possible to shorten the time required to perform a handover without increasing the constitutional complexity of a radio communication terminal apparatus.

(Embodiment 2)

Figure 5:
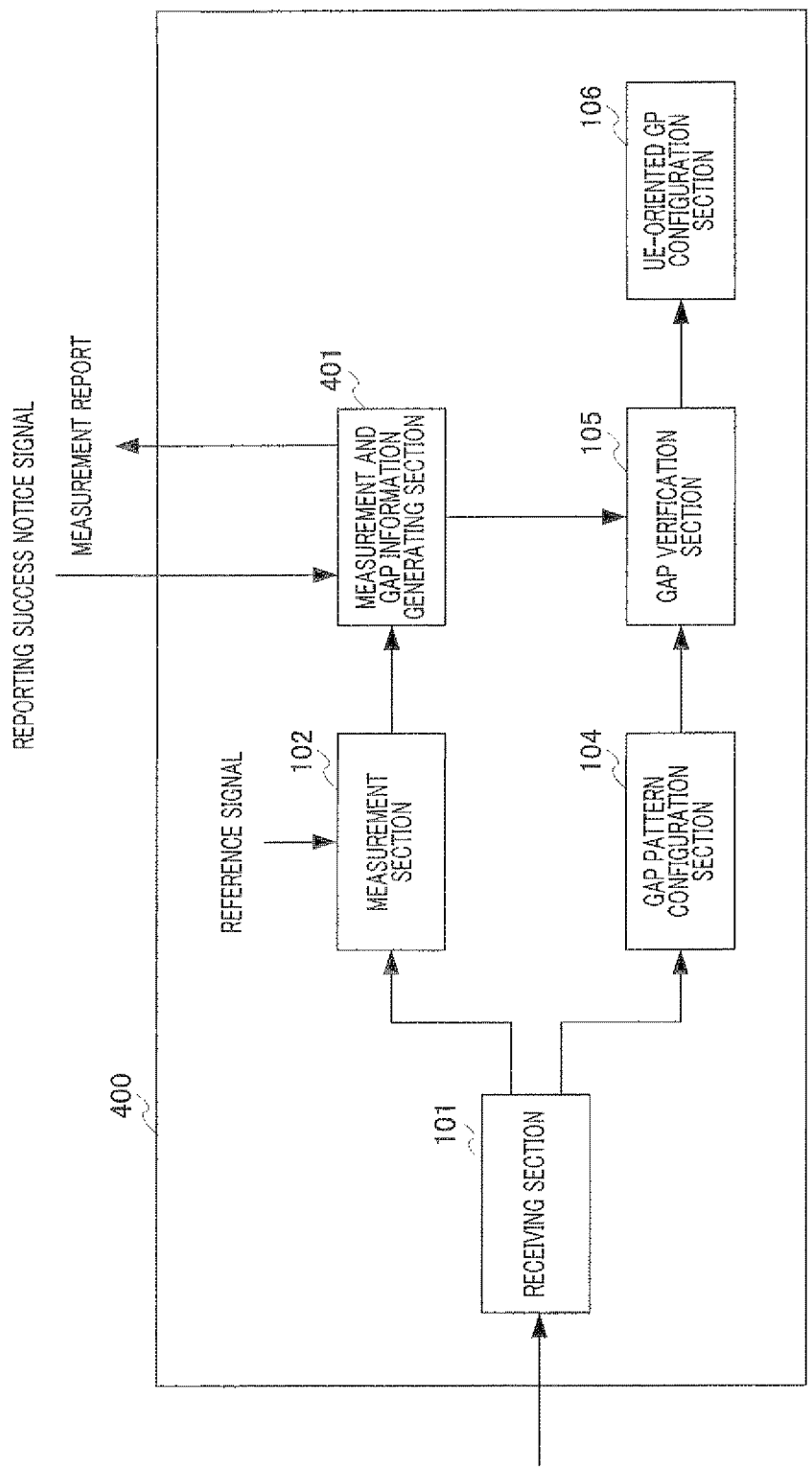
FIG. 5 is a block diagram showing a configuration of UE according to embodiment 2 of the present invention.

FIG. 5 is a block diagram showing a configuration of UE 400 according to embodiment 2 of the present invention. FIG. 5 differs from FIG. 1 in that measurement report generating section 103 is changed to measurement and gap information generating section 401.

Measurement and gap information generating section 401 decides gap information parameters that is the information showing a gap pattern of the measurement using UE-oriented GP, and reports this parameter to a base station by using a reporting message (i.e. measurement report message, or other messages). The gap information parameters is decided based on the information available only in UE 400, for example, the settings user provides respectively, the application running on the device, or the moving speed of the user.

According to these criteria, UE 400 can decide a gap pattern used for the measurement using UE-oriented GP. Thus, UE 400 can provide freely the gap information parameters to decide the gap pattern. UE 400 transmits the measurement result to base station 200 by a reporting message. This reporting message is referred to as a measurement report, intra-frequency measurement report as defined in 3GPP TS 36.331. This reporting message is referred to as "measurement report" hereinafter.

When a measurement report is transmitted properly from UE 400 to base station 200, measurement and gap information generating section 401 outputs a reporting success notice signal to gap verification section 105.

By this means, UE 400 can assure gap pattern synchronization with base station 200. Therefore, a data will not overlap with UE-oriented GP, so that a packet will not be lost.

Figure 6:
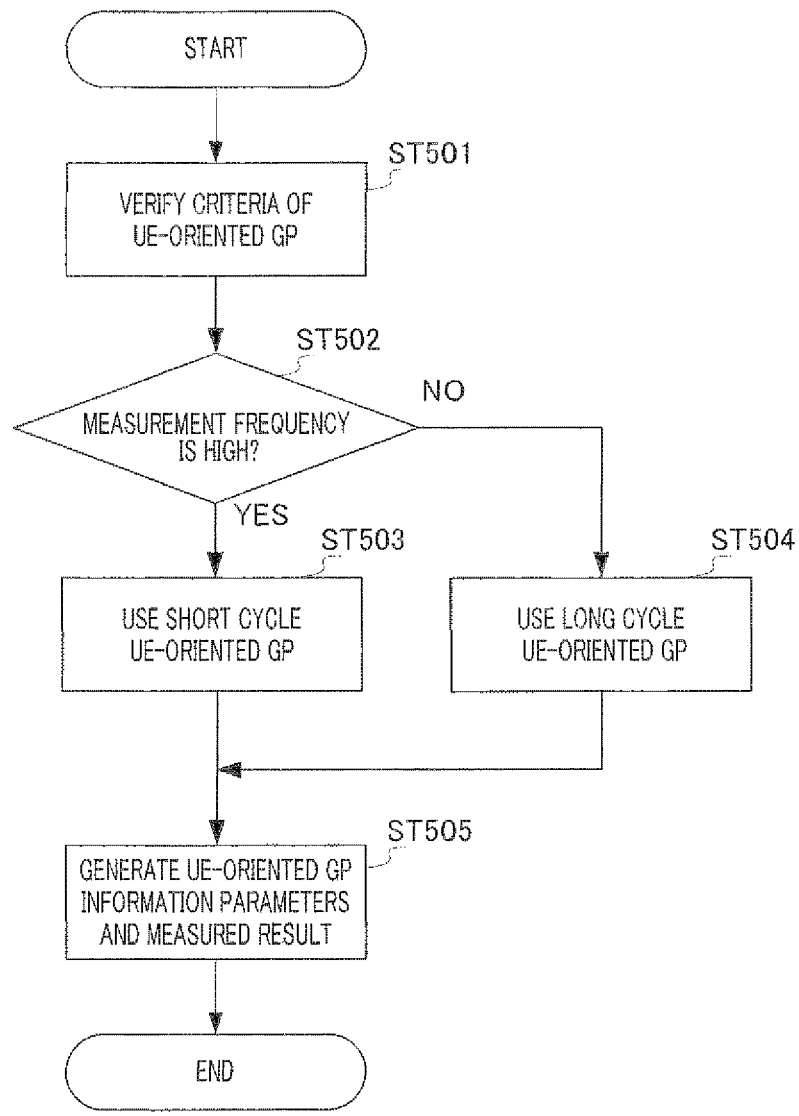
FIG. 6 is a flow diagram showing operation that UE shown in FIG. 5 determines gap information parameters.

Next, the method for UE 400 to decide UE-oriented GP information parameters will be described using FIG. 6. FIG. 6 is a flow diagram showing operation that UE 400 shown in FIG. 5 decides gap information parameters.

In ST 501, if it is necessary to measure other carrier frequencies, UE 400 starts a step to decide a gap pattern of the measurement using UE-oriented GP. As a reference, it is possible to use, for example, a fading signal that is an index of the moving speed of UE 400 and the instantaneous quality values of the current serving cell. Specifically, when the moving speed is fast or the quality of the current serving cell is poor, it is considered to be necessary to perform moving process fast, so that it is possible to, for example, measure other carrier frequencies or other systems.

As other means, it is possible to change the frequency according to the number of the detected CSG cells. For example, it is possible to increase the frequency of gaps, when the number of the detected. CSG cell is large, since many gaps are required to receive broadcast information, or decrease the frequency of gaps to receive broadcast information, when the number of the detected CSG cell is small.

In ST 502, UE 400 decides the frequency of the measurement using UE-oriented GP. Specifically, by using UE-oriented GP, UE 400 decides the frequency of the measurement and determines whether or not the measurement frequency is high. When measurement frequency is identified as higher than the desired threshold (YES) by the mobile speed or the quality of serving cells as above, the step moves to ST 503, and when measurement frequency is identified as lower than the desired threshold (NO), move to ST 504.

In ST 503, UE 400 uses UE-oriented GP with a short cycle to increase measurement frequency that uses UE-oriented GP. Specifically, a short gap cycle is provided while the designated gap length remains as is. These provided gap information parameters (hereinafter also referred to as "UE-oriented GP information parameters") include information, such as short gap cycle parameters and gap identification information parameters.

In ST 504, UE 400 uses UE-oriented GP with a long gap cycle to decrease measurement frequency that uses UE-oriented GP. Specifically, a long gap cycle is provided while the designated gap length parameters remains as is. UE-oriented GP information parameters include, for example, a long gap cycle parameters and gap identification information parameters.

ST 505 generates UE-oriented GP information parameters and the measured result, and includes these in a measurement report to be sent to base station 200. The purpose to include UE-oriented GP information parameters in a measurement report is to inform base station 200 that UE 400 starts measurement using UE-oriented GP that is based on the designated gap length and the gap cycle decided by UE 400. Thus, by including UE-oriented GP information parameters in a measurement report, it is possible to synchronize UE-oriented GP between base station 200 and UE 400.

Next, an operation of UE 400 of using each criterion will be described. First, a case where a fading signal is adopted as criteria will be described.

When a fading signal indicates that UE 400 moves fast, it is expected that the possibility of a handover (mobility) is high in UE 400. Thus, a high measurement frequency is necessary. UE 400 provides a short cycle gap pattern and performs measurement more frequently.

On the other hand, when a fading signal indicates that UE 400 moves slow, it is expected that the possibility of a handover is low in UE 400. Thus, a low measurement frequency is possible. UE 400 provides a long cycle gap pattern and measures less frequently.

Next, a case where the instantaneous quality value of the current serving cell is adopted as criteria will be described.

When the instantaneous quality value deteriorates, it is expected that reception condition from base station 200 is poor in UE 400. This implies a need for UE 400 to perform a handover mobility step in order to assure connectivity. Thus, a high measurement frequency is necessary, so that UE 400 provides a short cycle gap pattern.

Meanwhile, when the instantaneous quality value ameliorates or is good, a need for UE 400 to perform a handover mobility step is less demand. Thus, it is possible to lower measurement frequency related to UE 400 mobility. UE 400 provides a long cycle gap pattern and performs measurement less frequently.

Figure 7:
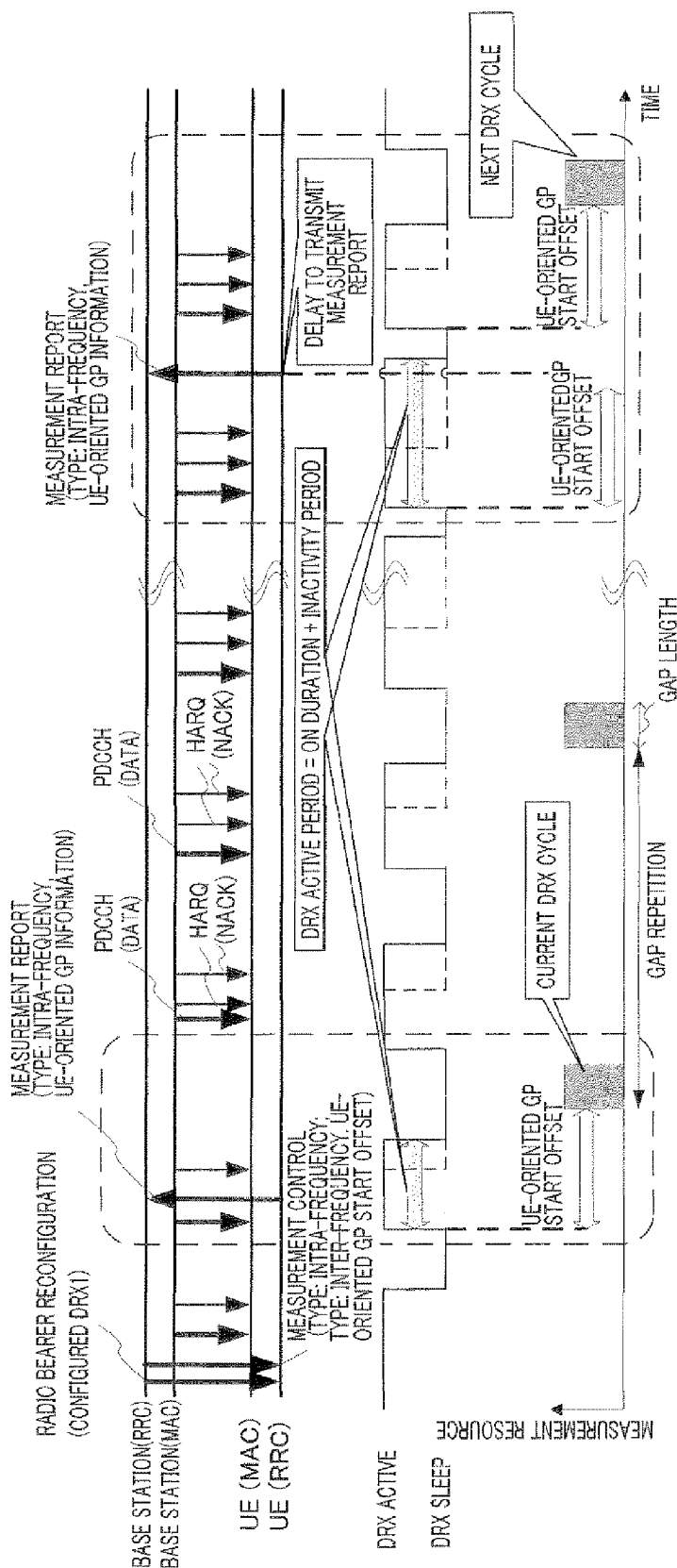
FIG. 7 shows a signaling flow of UE shown in FIG. 5 and the base station shown in FIG. 2.

FIG. 7 shows signaling flow of UE 400 shown in FIG. 5 and base station 200 shown in FIG. 2. In this diagram, a case where gap pattern synchronization between UE 400 and base station 200 is assured will be described.

Base station 200 provides gap pattern configuration information and measurement configuration information by using radio resource control (RRC). Base station 200 transmits these configuration information from transmitting section 204 to UE 400. UE 400 receives messages transmitted from base station 200 and processes these configuration information.

When an idle period is required to measure other carrier frequencies, UE 400 decides UE-oriented GP configuration based on gap pattern criteria. Measurement and gap information generating section 401 generates this UE-oriented GP configuration information and the evaluated measurement result, and transmits these to base station 200 via an uplink dedicated control signaling.

After a measurement report that includes UE-oriented GP is transmitted properly to base station 200, in gap verification section 105, gap verification for UE-oriented GP start offset is performed by using the configured gap pattern parameters (UE-oriented GP start offset). When UE-oriented GP starts, gap verification section 105 determines whether or not the DRX active period and the gaps overlap. This determination is made by comparing the length of extended DRX active period and the length of UE-oriented GP start offset. Since this operation is the same as the content described in embodiment 1, the description will be omitted.

UE does not decide a gap cycle freely, and it is equally possible for a base station to provide a guide line and report to UE. For example, in the case to decide a gap cycle based on the moving speed of UE, it is possible, for example, to report to UE a threshold of the moving speed of UE that decides whether the gap frequency is high or low. In this case, UE will decide a gap cycle according to a guideline indicated by a base station.

In addition, it is also possible for a base station to report to UE an option of gap repetition. Specifically, for example, when more than three gap cycles are prepared under standardization, it is possible for a base station to report to UE which gap cycle to select. In 3GPP LTE which is currently standardized, two cycles, such as 40 ms and 80 ms, are defined. Thus, UE according to embodiment 2 only selects 40 ms or 80 ms. However, for example, 20 ms or 160 ms of gap cycles are possible to be added in future, so that, in that case, by narrowing down the options, it is possible to allow UE to make a choice that suits operation of a base station.

According to embodiment 2, by controlling the measurement frequency using UE-oriented GP according to UE reception condition, it is possible to increase measurement frequency by using a short cycle UE-oriented GP and prepare for a handover, when UE has poor reception condition, or it is possible to decrease measurement frequency by using a long cycle UE-oriented GP and lower UE power consumption, when UE has good reception condition.

(Embodiment 3)

Figure 8:
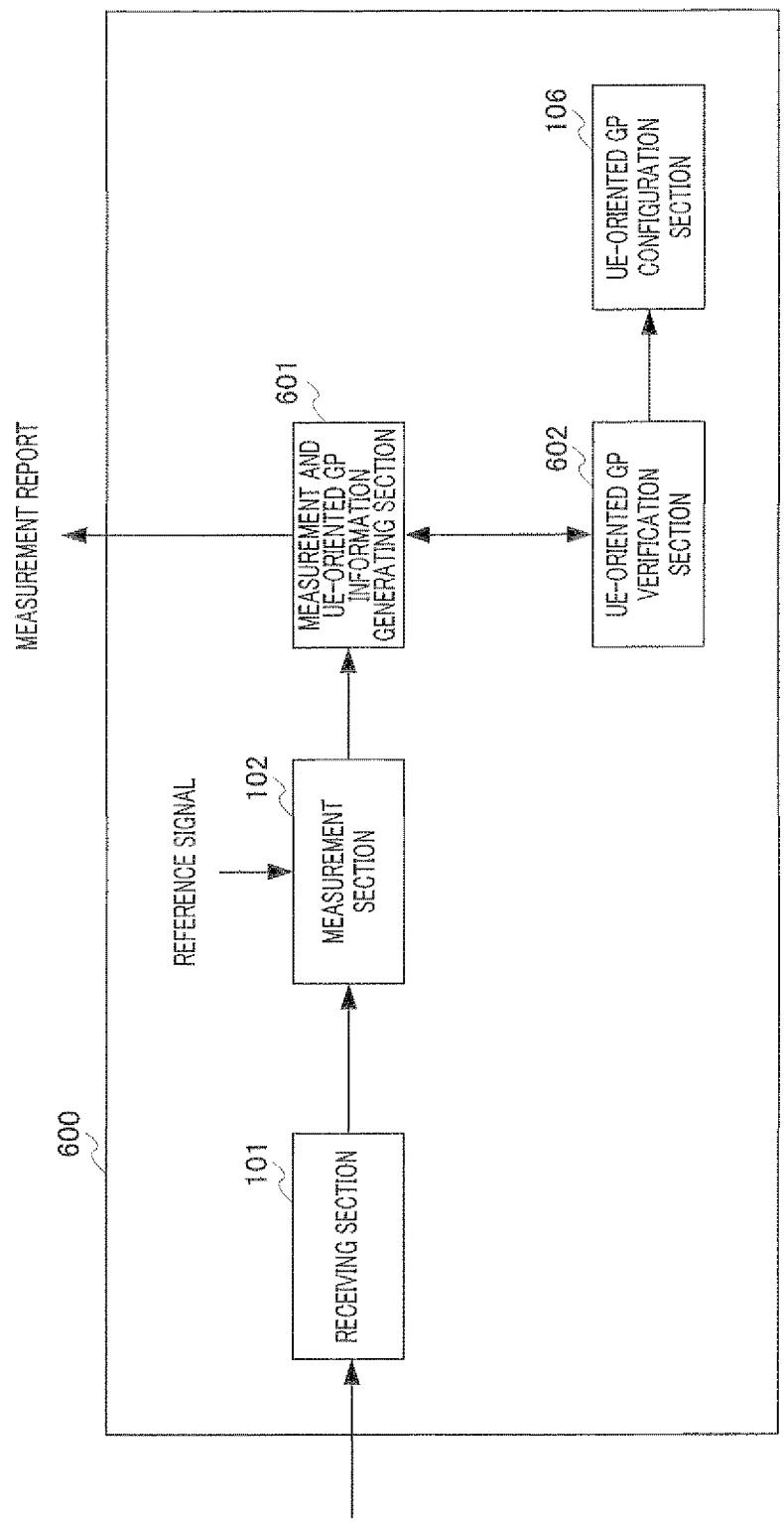
FIG. 8 is a block diagram showing a configuration of UE according to embodiment 3 of the present invention.

FIG. 8 is a block diagram showing a configuration of base station 600 according to embodiment 3 of the present invention. FIG. 8 differs from FIG. 1 in that gap pattern configuration section 104 is removed, measurement report generating section 103 replaces measurement and UE-oriented. GP information generating section 601, and gap verification section 105 replaces UE-oriented GP verification section 602.

When the measurement reporting criteria are met, measurement and UE-oriented GP information generating section 601 generates each configuration information and includes the information in a measurement report. While measurement and UE-oriented GP information generating section 601 decides UE-oriented GP period parameter including the time required for CQI reporting from UE 600, provides the decided UE-oriented GP period parameters, at the same time, measurement and UE-oriented GP information generating section 601 includes this configuration information in a measurement report and transmits to base station 200. When a measurement report is transmitted within the extended DRX active period, the reporting notification is output to UE-oriented GP verification section 602.

UE-oriented GP verification section 602 verifies whether to activate UE-oriented GP in the current DRX cycle or in the next DRX cycle by using UE-oriented GP period parameters. Once the position to start UE-oriented GP is decided based on UE-oriented GP period parameters, UE-oriented GP verification section 602 provides UE-oriented GP.

Figure 9A:
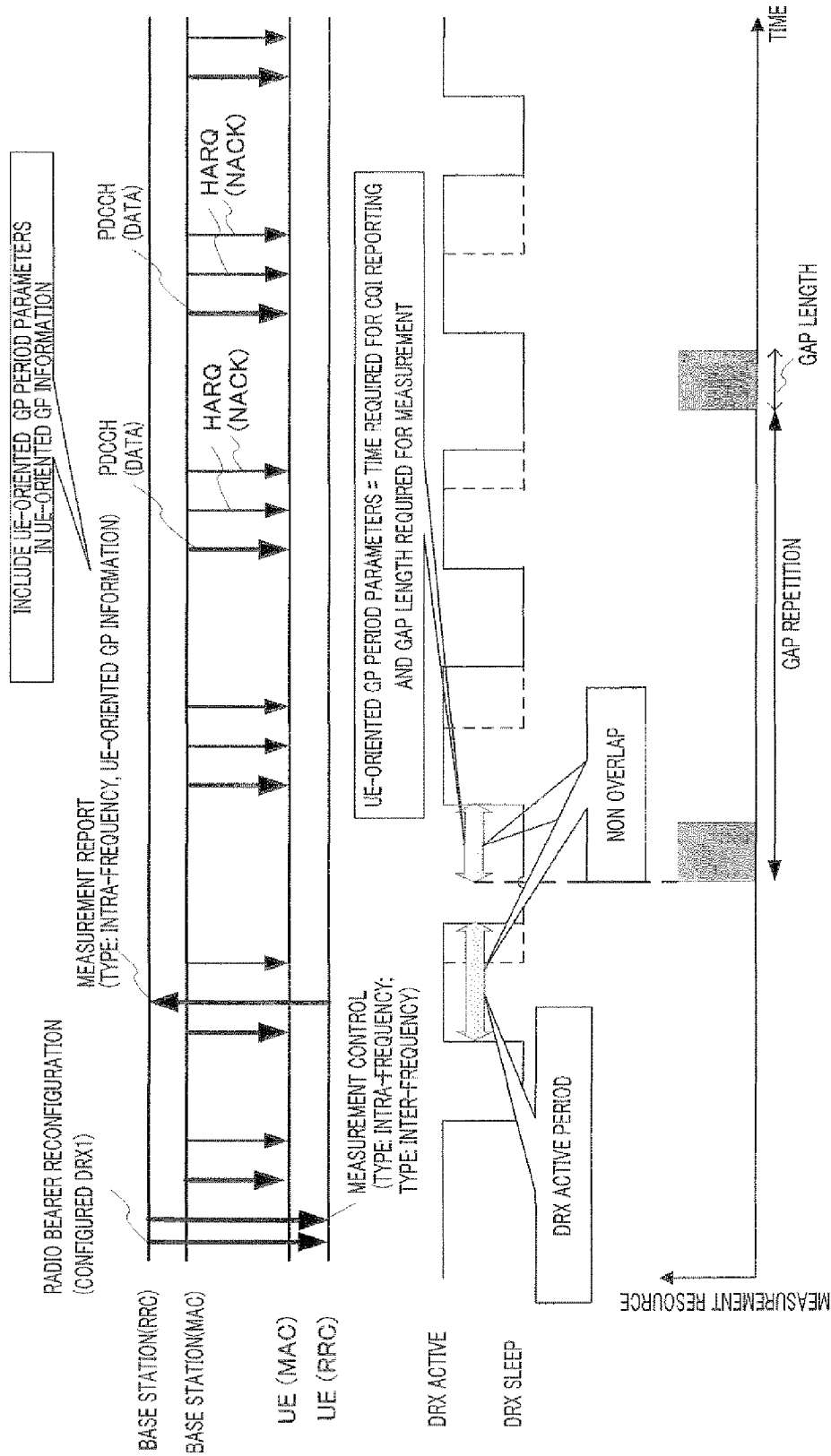
FIG. 9A shows a signaling flow of UE shown in FIG. 8 and the base station shown in FIG. 2.
Figure 9B:
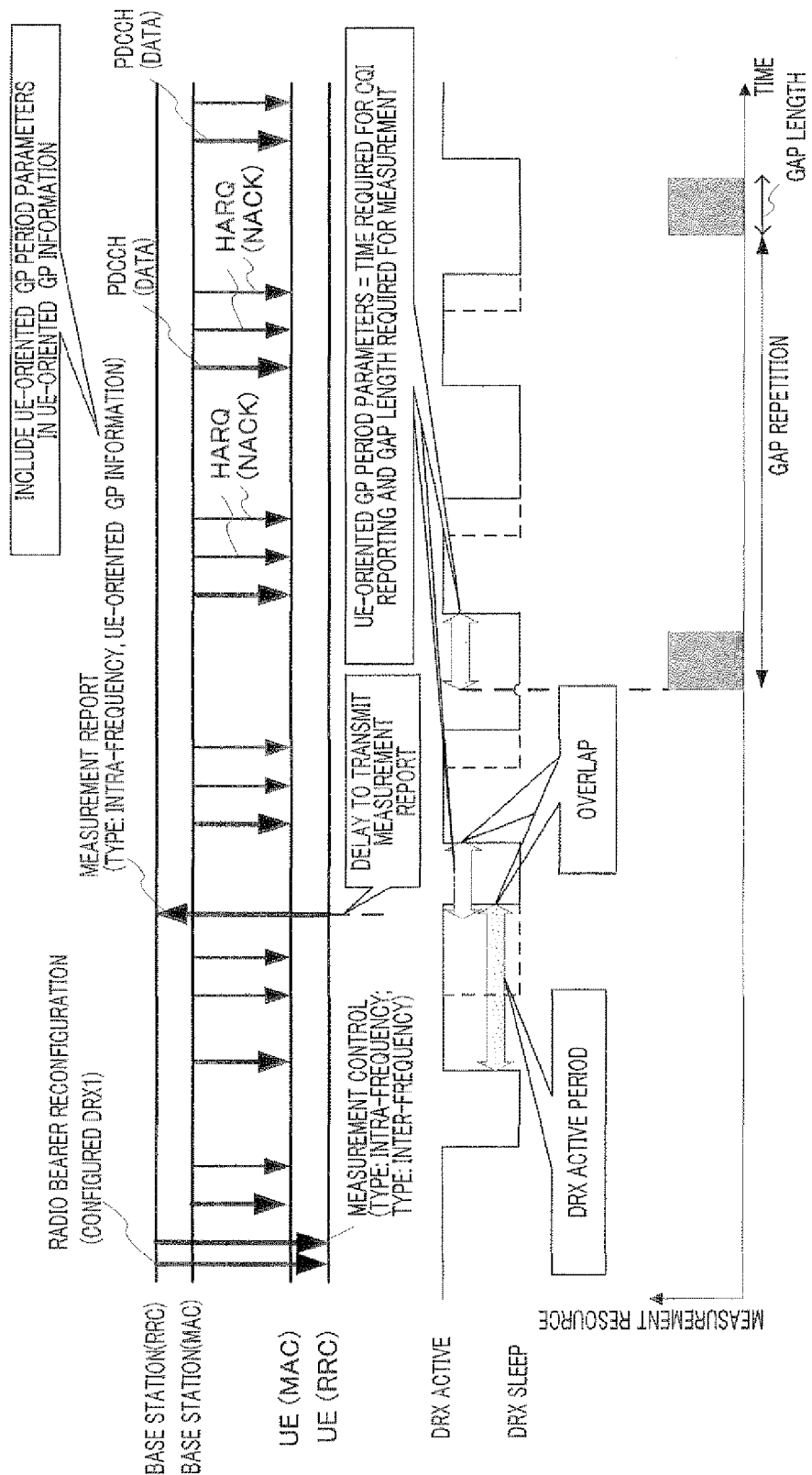
FIG. 9B shows a signaling flow of UE shown in FIG. 8 and the base station shown in FIG. 2.

FIG. 9 shows signaling flow of UE 600 shown in FIG. 8 and base station 200 shown in FIG. 2. FIG. 9 illustrates an example that UE 600 decides UE-oriented GP period parameters, and verifies whether to start UE-oriented GP in the current DRX cycle or in the next DRX cycle.

UE 600 stores the measurement configuration information, and processes and measure in measurement section 102. When the measurement reporting criteria are met, UE 600 decides UE-oriented GP period parameters based on the criteria to decide UE-oriented GP, and configures the gap information parameters. The criteria are based on the time required for measurement that is necessary to report channel quality indicator (CQI), and the gap length designated for measurement. Specifically, when the channel quality indicator is reported at the beginning subframe of DRX active, the criteria are the sum of the time required for measurement that is necessary to report channel quality indicator, and the gap length designated for measurement. When the channel quality indicator is reported at 2-subframe from the beginning of DRX active, the criteria are the value to subtract 1-subframe from the sum of the time required for measurement that is necessary to report channel quality indicator and the gap length designated for measurement.

In this way, it is possible to decide UE-oriented GP period parameters by using the operation related to CQI reporting interval in UE 600 (for example, the position of CQI reporting in the DRX-On duration). When UE-oriented GP period parameters is decided, as defined in 3GPP TS 36.331, measurement and UE-oriented GP information generating section 601 includes UE-oriented GP information parameters and the measured results in a measurement report and transmits to base station 200.

When a measurement report which includes UE-oriented GP information parameters is transmitted, UE 600 adopts UE-oriented GP period parameters and verifies the DRX cycle where UE-oriented GP can start. UE-oriented GP verification section 602 activates UE-oriented GP just before the beginning of DRX-On duration based on the following conditions.

Condition #1 (see FIG. 9A): (Configured DRX cycle—(DRX active period where a measurement report which includes UE-oriented GP information parameters is sent))>UE-oriented GP period. Condition #2 (see FIG. 9B): (Configured DRX cycle—(DRX active period where a measurement report which includes UE-oriented GP information parameters is sent))=<UE-oriented GP period.

When a measurement report including UE-oriented GP information parameters is transmitted and the length of the extended DRX active period does not overlap with the length of UE-oriented GP period parameters when the starting point of the DRX-On duration from the next DRX cycle is defined as a reference, in UE 600, the DRX active period does not overlap with the measurement when UE-oriented GP starts. Thus, as shown as condition #1 in FIG. 9A, UE 600 starts UE-oriented GP at the position where the remaining time within the current DRX cycle is equal to the length of UE-oriented GP period parameters.

When a measurement report including UE-oriented GP information parameters is transmitted and the length of the extended DRX active period overlaps with the length of UE-oriented GP period parameters when the starting point of the DRX-On duration from the next DRX cycle is defined as a reference, in UE 600, the DRX active period overlaps with the measurement when UE-oriented GP starts. Thus, as shown as condition #2 in FIG. 9B, UE 600 starts UE-oriented GP at the position where the remaining time within the next DRX cycle is equal to the length of UE-oriented GP period parameters.

Figure 10:
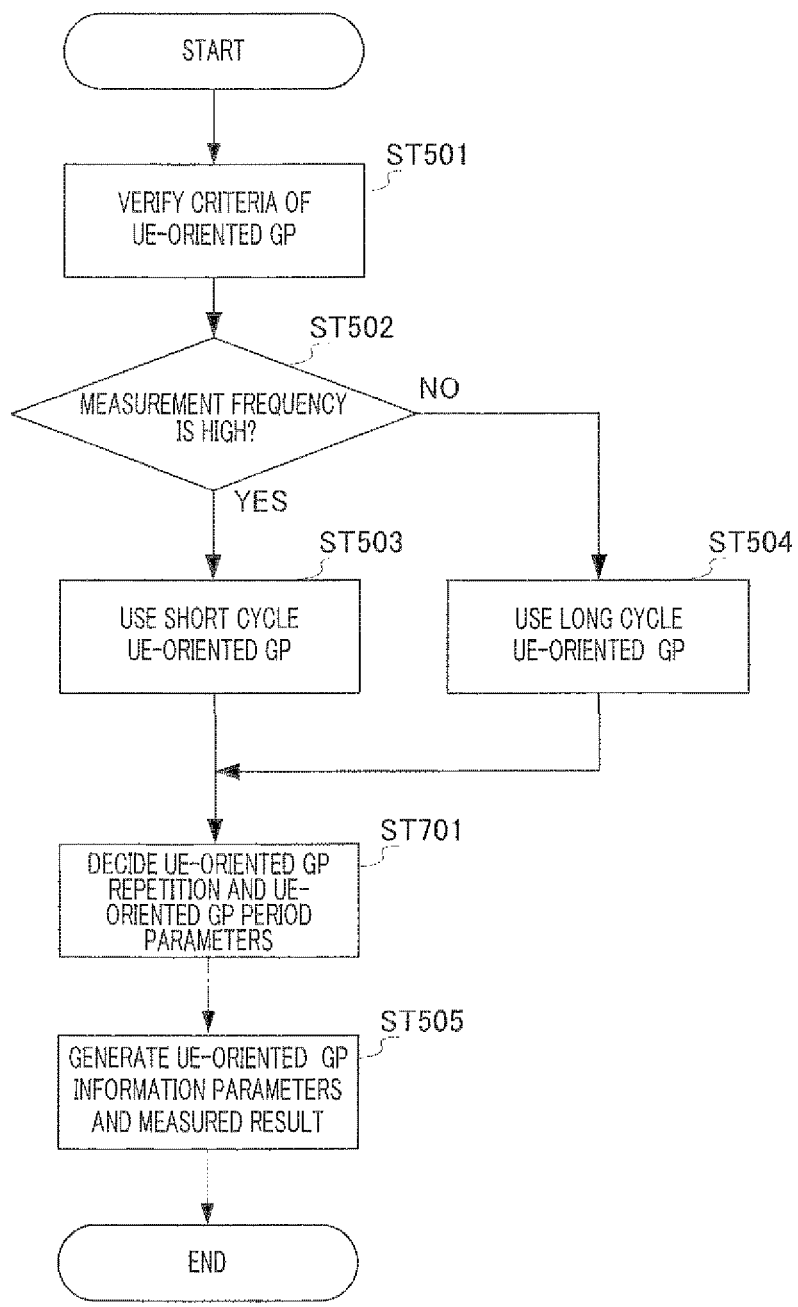
FIG. 10 is a flow diagram showing a method for UE shown in FIG. 8 to determine UE-oriented GP information parameters.

Next, the method for UE 600 shown in FIG. 8 to decide UE-oriented GP information parameters will be described using FIG. 10. In FIG. 10, the same components of FIG. 6 will be assigned the same reference numerals in FIG. 6 and their explanations will be omitted.

In ST 701, measurement and UE-oriented GP information generating section 601 decides repetition of UE-oriented GP based on a measurement requirement level, and outputs gap repetition configuration information to UE-oriented GP verification section 602. UE-oriented GP verification section 602 decides UE-oriented GP period parameters based on criteria lists to select UE-oriented GP, and verifies the position to start UE-oriented GP. UE-oriented GP verification section 602 adopts the CQI reporting interval (for example, the position of CQI reporting of the DRX-On duration) in UE 600 and decides the length of UE-oriented GP period parameter.

After deciding UE-oriented GP duration parameters, UE-oriented GP verification section 602 outputs the parameters and the gap repetition configuration information to measurement and UE-oriented GP information generating section 601. UE 600 includes these configuration parameters in a measurement report and transmits to base station 200. By including UE-oriented GP period parameters in a measurement report, it is possible to report to base station 200 the position where UE 600 starts UE-oriented GP.

Figure 11:
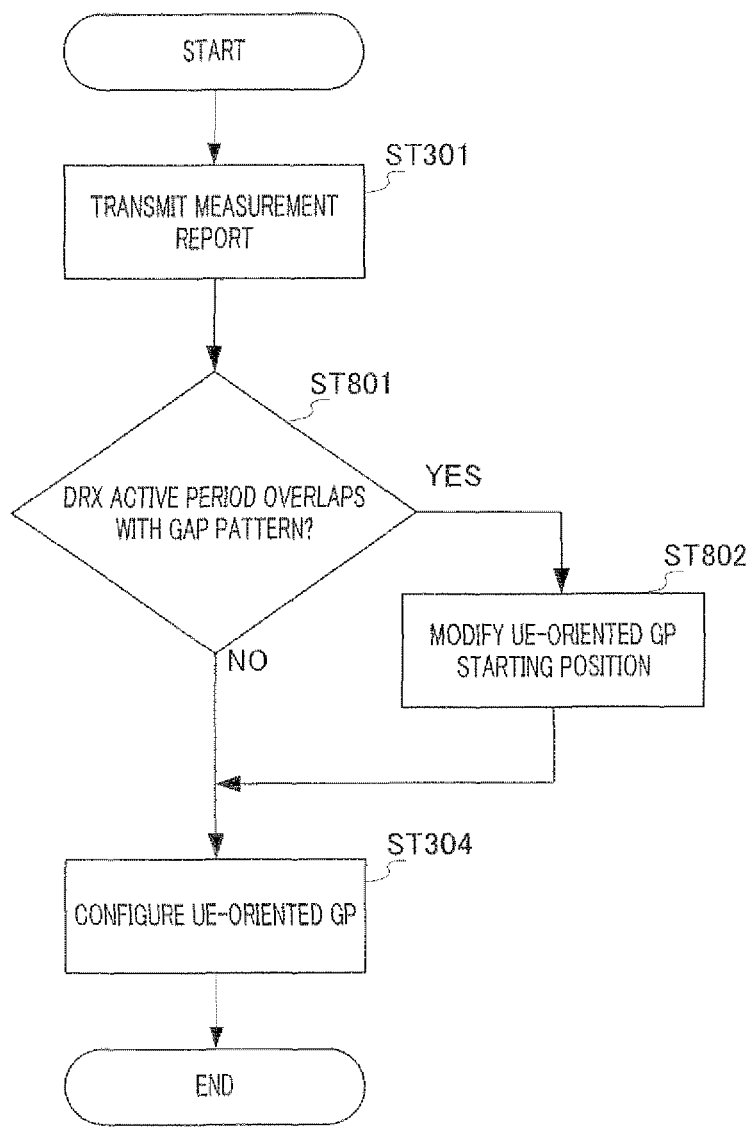
FIG. 11 is a flow diagram showing a method for UE shown in FIG. 8 to use UE-oriented GP.

Next, based on a trigger of a measurement report, the method for UE 600 to use UE-oriented GP will be explained using FIG. 11. FIG. 11 is a flow diagram showing the steps where UE 600 decides the position to start UE-oriented GP in the current DRX cycle or in the next DRX cycle. In FIG. 11, the same components of FIG. 4 will be assigned the same reference numerals in FIG. 4 and their explanations will be omitted.

In ST 801, in the checking step of the DRX active period, UE-oriented GP verification section 602 adopts UE-oriented GP period parameters, verifies whether or not the DRX active period overlaps with gaps, and decides the position to start UE-oriented GP. When the DRX active period overlaps with UE-oriented. GP (YES), the step moves to ST 802, and when the DRX active period does not overlap with UE-oriented GP (NO), the step moves to ST 304.

In ST 802, as the starting position of UE-oriented GP, UE-oriented GP verification section 602 adopts the length of UE-oriented GP period parameters when the start point of the DRX-On duration in the next DRX cycle is defined as a reference.

According to embodiment 3, by starting UE-oriented GP in the current DRX cycle or in the next DRX cycle depending on the relationship of length between UE-oriented GP period parameters that include the time required for CQI reporting from UE 600 and the extended DRX active period, it is possible to shorten the time required to perform a handover without increasing the constitutional complexity of a radio communication terminal apparatus.

(Embodiment 4)

Figure 12:
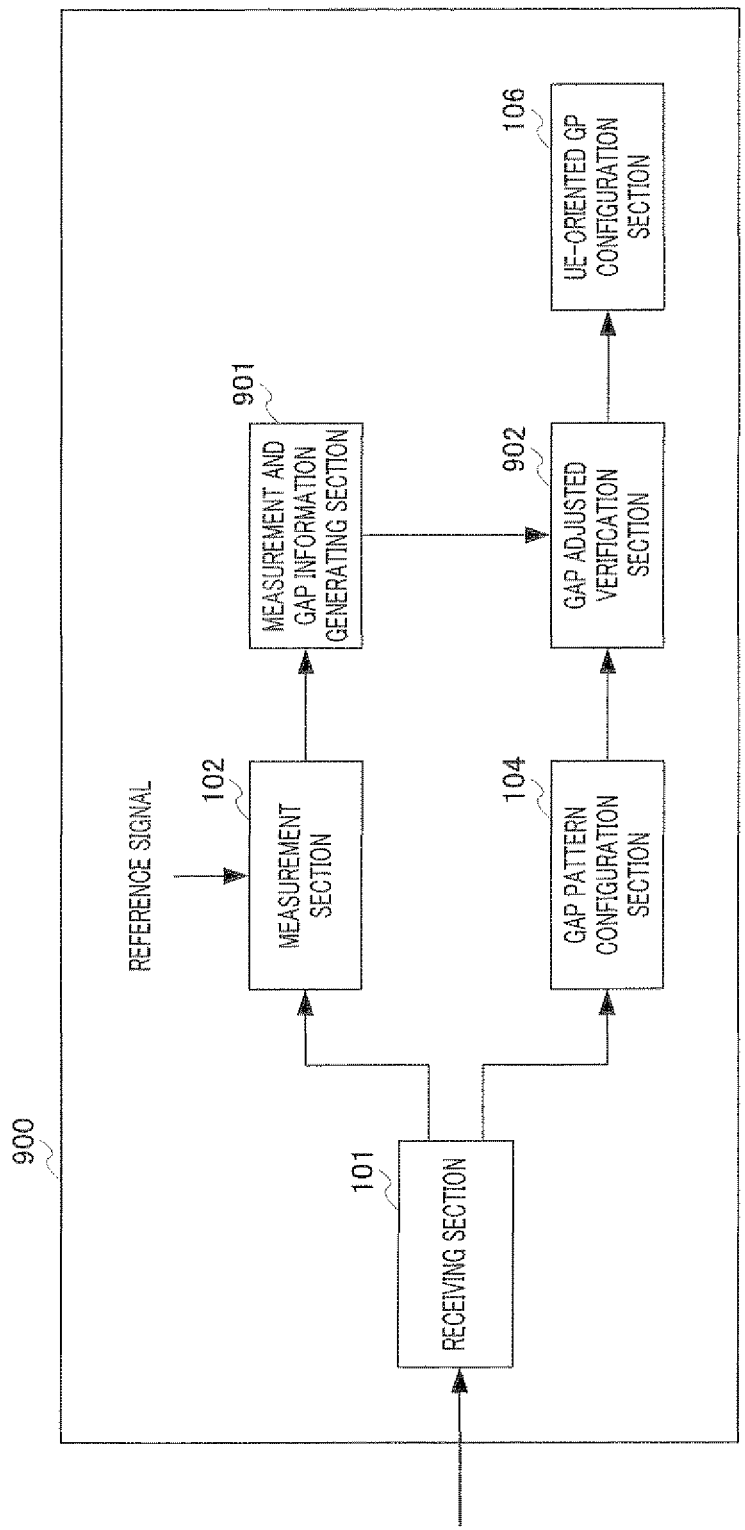
FIG. 12 is a block diagram showing a configuration of UE according to embodiment 4 of the present invention.

FIG. 12 is a block diagram showing a configuration of UE 900 according to embodiment 4 of the present invention. FIG. 12 differs from FIG. 1 in that measurement report generating section 103 is changed to measurement and gap information generating section 901, and gap verification section 105 is changed to gap adjusted verification section 902.

Measurement and gap information generating section 901 generates configuration information from the UE-oriented GP information parameters and the measurement result output from measurement section 102, and includes in a measurement report. Measurement and gap information generating section 901 does not transmit a measurement report to base station 200, and outputs this configuration information to gap adjusted verification section 902.

Gap adjusted verification section 902 starts UE-oriented GP based on lists of criteria. Once the criteria are met, gap adjusted verification section 902 adopts UE-oriented GP start offset that is stored in gap pattern configuration section 104 and starts UE-oriented GP.

Figure 13:
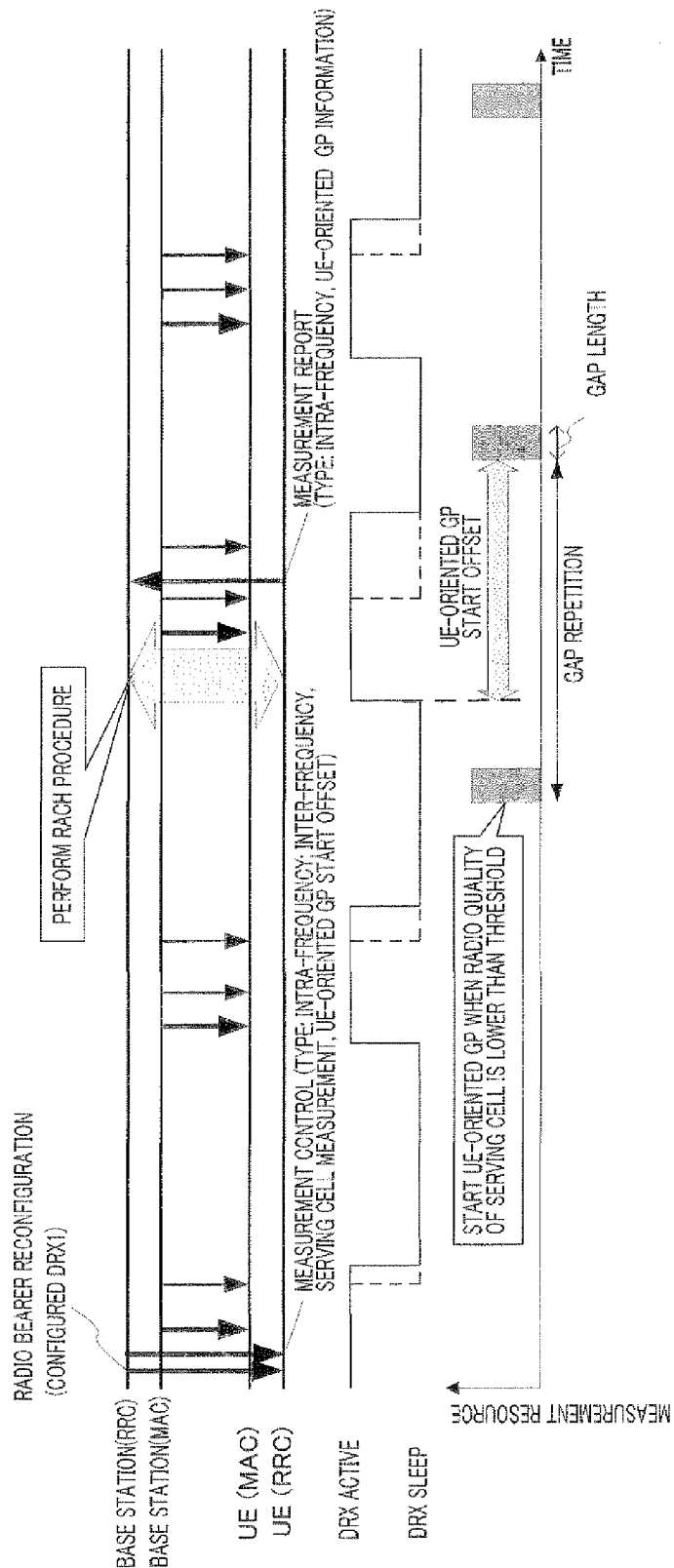
FIG. 13 shows a signaling flow of UE shown in FIG. 12 and the base station shown in FIG. 2.

UE 900 evaluates whether to transmit a measurement report to base station 200 based on transmission criteria. When the transmission criteria are met, UE 900 provides UE-oriented GP information parameters and transmits to base station 200 via a measurement report. When the transmission criteria are not met, UE 900 does not transmit a measurement report to base station 200 as shown in FIG. 13. Here, the transmission criteria are, for example, the presence or absence of other data to transmit and receive, and the length of DRX cycle. For example, if there is other data to transmit and receive, power consumption does not increase even when a measurement report is transmitted, and if there is no other data to transmit and receive, it is ideal not to transmit to reduce power consumption. Also, if DRX repetition is short, power consumption does not increase when a measurement report is transmitted, and if DRX repetition is long, it is preferable not to transmit a measurement report to reduce power consumption.

According to the configuration above, even when using a service with a long DRX configuration, it is possible for UE 900 to activate measurement by using UE-oriented GP, whether or not a measurement report is transmitted.

FIG. 13 shows signaling flow of UE 900 shown in FIG. 12 and base station 200 shown in FIG. 2. FIG. 13 illustrates an example for UE 900 to establish a service of a long DRX configuration and start UE-oriented GP, whether a measurement report is transmit immediately or not.

UE 900 stores the measurement configuration information, and processes and measure in measurement section 102. When the criteria to start UE-oriented GP are met, UE 900 immediately starts measurement using the started UE-oriented GP.

The criteria to start UE-oriented GP can be based on a threshold provided for radio quality of a serving cell. For example, when the radio quality of UE 900 serving cells drops below the threshold, UE 900 starts UE-oriented GP in the current DRX cycle.

As base station 200 can synchronize gap pattern start with UE 900 for measurement, UE 900 determines whether or not it is necessary to provide UE-oriented GP information parameters and transmit to base station 200 via a measurement report as defined in 3GPP TS 36.331. Thus, whether or not UE 900 needs to transmit a measurement report can be determined based on 1) when UE 900 is required to resume downlink or uplink data; or 2) when the extended DRX active period of UE 900 is expected to overlap with UE-oriented GP. Furthermore, UE 900 transmits a measurement report by using random access step to transmit a measurement report, only when determining that the synchronization with base station 200 is necessary.

Figure 14:
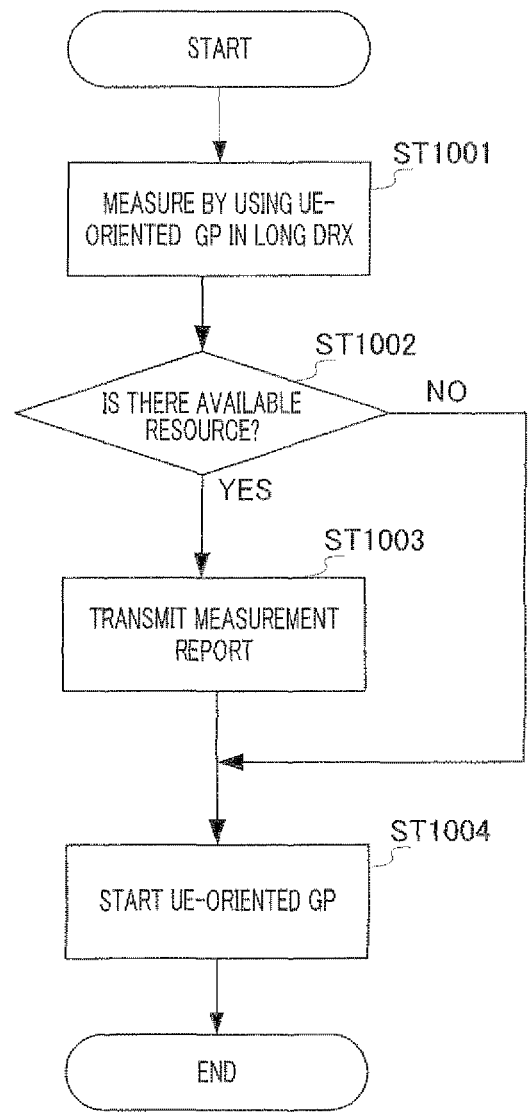
FIG. 14 is a flow diagram shows operation of a gap adjusted verification section shown in FIG. 12.

FIG. 14 is a flow diagram showing operation of gap adjusted verification section 902 shown in FIG. 12. In FIG. 14, in ST 1001, gap adjusted verification section 902 obtains UE-oriented GP information parameters and a measurement result, and, base on criteria of UE-oriented GP in a long DRX, determines whether or not UE 900 needs to start to measure other carrier frequencies using UE-oriented GP.

It is possible to control UE-oriented GP in a long DRX based on a threshold configured for radio quality of serving cells. When the radio quality of serving cells drops below the threshold, UE 900 starts UE-oriented GP based on UE-oriented GP start offset.

In ST 1002, UE 900 determines whether or not there is an available uplink resource to transmit a measurement report to base station 200. When an uplink resource is available (YES), the step moves to ST 1003, and when an uplink resource is not available (NO), the step moves to ST 1004.

In ST 1003, UE 900 transmits a measurement report including UE-oriented GP information parameters to base station 200, and in ST 1004, UE 900 starts UE-oriented GP.

According to embodiment 4, by starting UE-oriented GP when a long DRX is provided, whether or not to transmit a measurement report, it is possible to shorten the time required to perform a handover without increasing the constitutional complexity of radio communication terminal apparatus.

(Embodiment 5)

Figure 15:
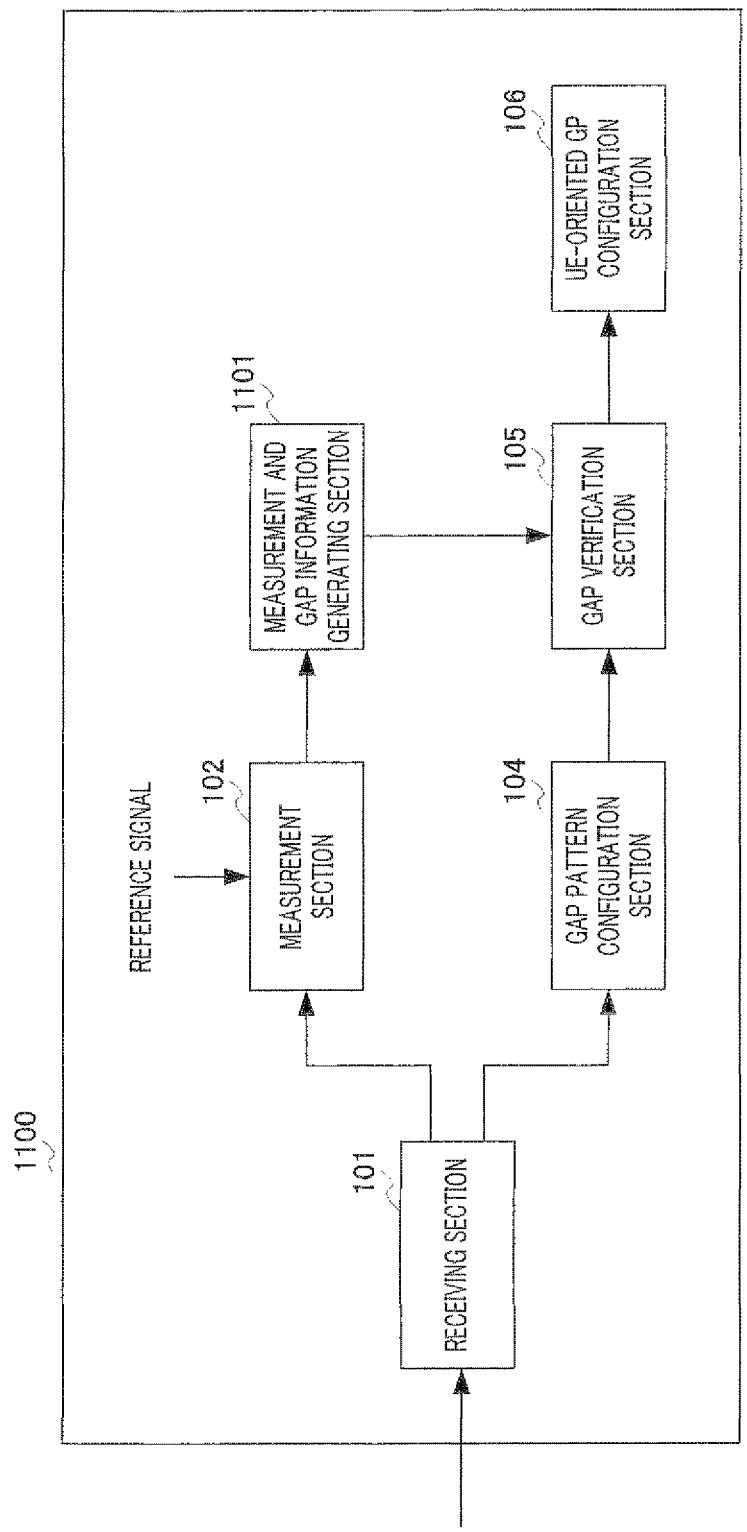
FIG. 15 is a block diagram showing a configuration of UE according to embodiment 5 of the present invention.

FIG. 15 is a block diagram showing a configuration of UE 1100 according to embodiment 5 of the present invention. FIG. 15 differs from FIG. 1 in that measurement report generating section 103 is changed to measurement and gap information generating section 1101.

Measurement and gap information generating section 1101 decides the cycle of UE-oriented GP based on the measurement frequency. In addition, when different measurement type are configured by base station 200, UE 1100 decides an adequate gap length corresponding to the configured measurement type.

Figure 16:
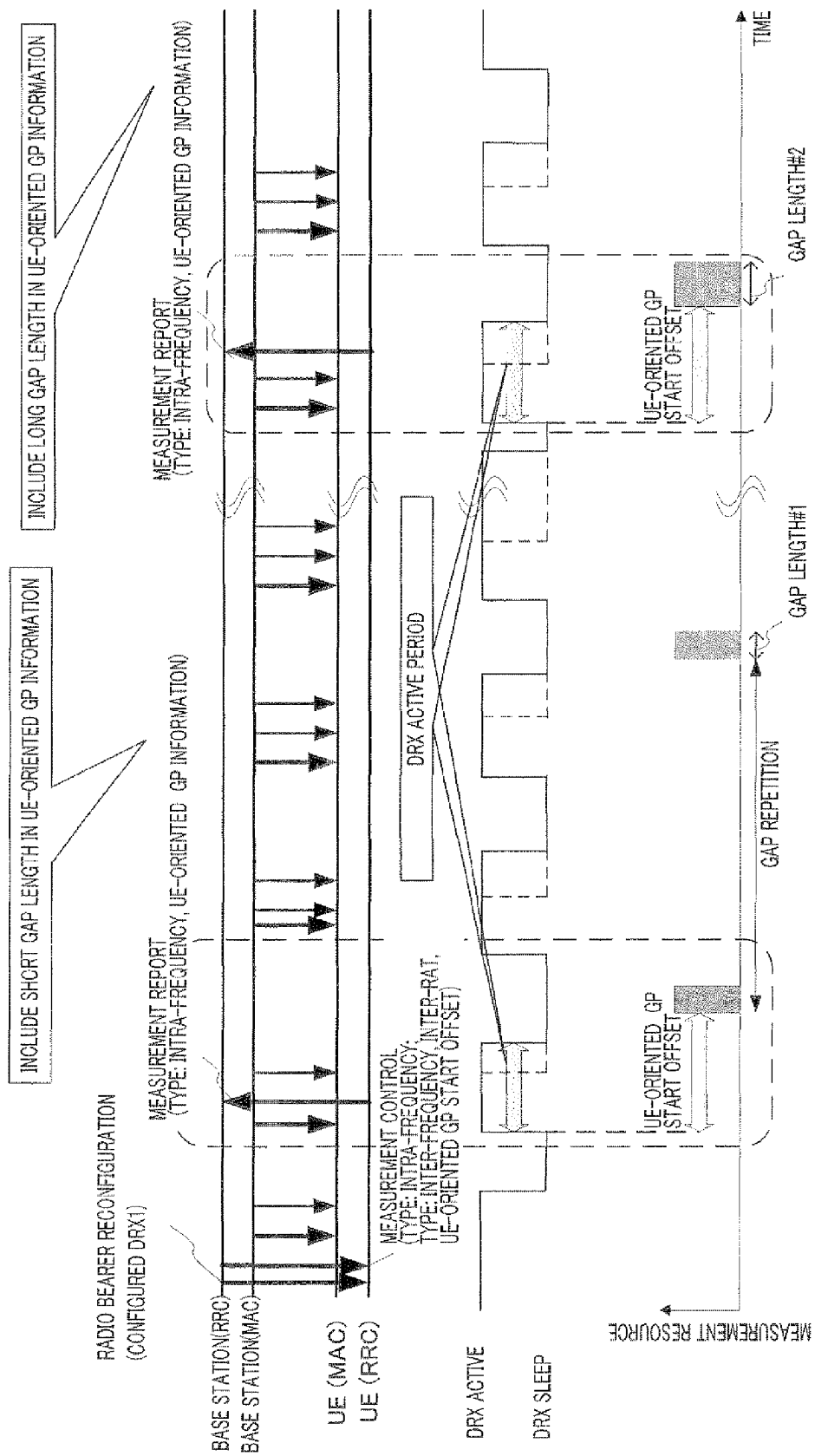
FIG. 16 shows a signaling flow of UE shown in FIG. 15 and the base station shown in FIG. 2.

FIG. 16 shows signaling flow of UE 1100 shown in FIG. 15 and base station 200 shown in FIG. 2. This diagram shows the signaling flow of when UE 1100 uses a plurality of gap lengths.

In this embodiment, UE 1100 decides a measurement demand level and an individual gap length adopted for this measurement. This is because UE 1100 adopts different gap lengths corresponding to different measurements. Specifically, in the case of measurements of, for example, inter-frequency E-UTRA, inter-RAT UTRAN or inter-RAT GERAN, UE 1100 adopts a common gap length to perform measurement. For other measurements (for example, WiMAX), UE 1100 adopts a different gap length to perform measurement Thus, base on the configured measurement types, UE 1100 can decide an adequate gap length for the measurement using UE-oriented GP.

Measurement section 102 of UE 1100 decides a gap length based on the configured information. Once deciding an adequate gap length, UE 1100 provides gap length parameters and includes this information in UE-oriented GP information parameters included in a measurement report. Thus, UE 1100 activates UE-oriented GP having an adequate gap length and adequate gap repetition, and transmits to base station 200 via a measurement report.

As shown in FIG. 16, when UE 1100 activates UE-oriented GP by using an adequate gap repetition and gap length, UE 1100 provides these gap related parameters in UE-oriented GP information parameters and transmits to base station 200 via a measurement report. By this means, it is possible to maintain and guarantee UE-oriented GP synchronization between base station 200 and UE 1100.

Figure 17:
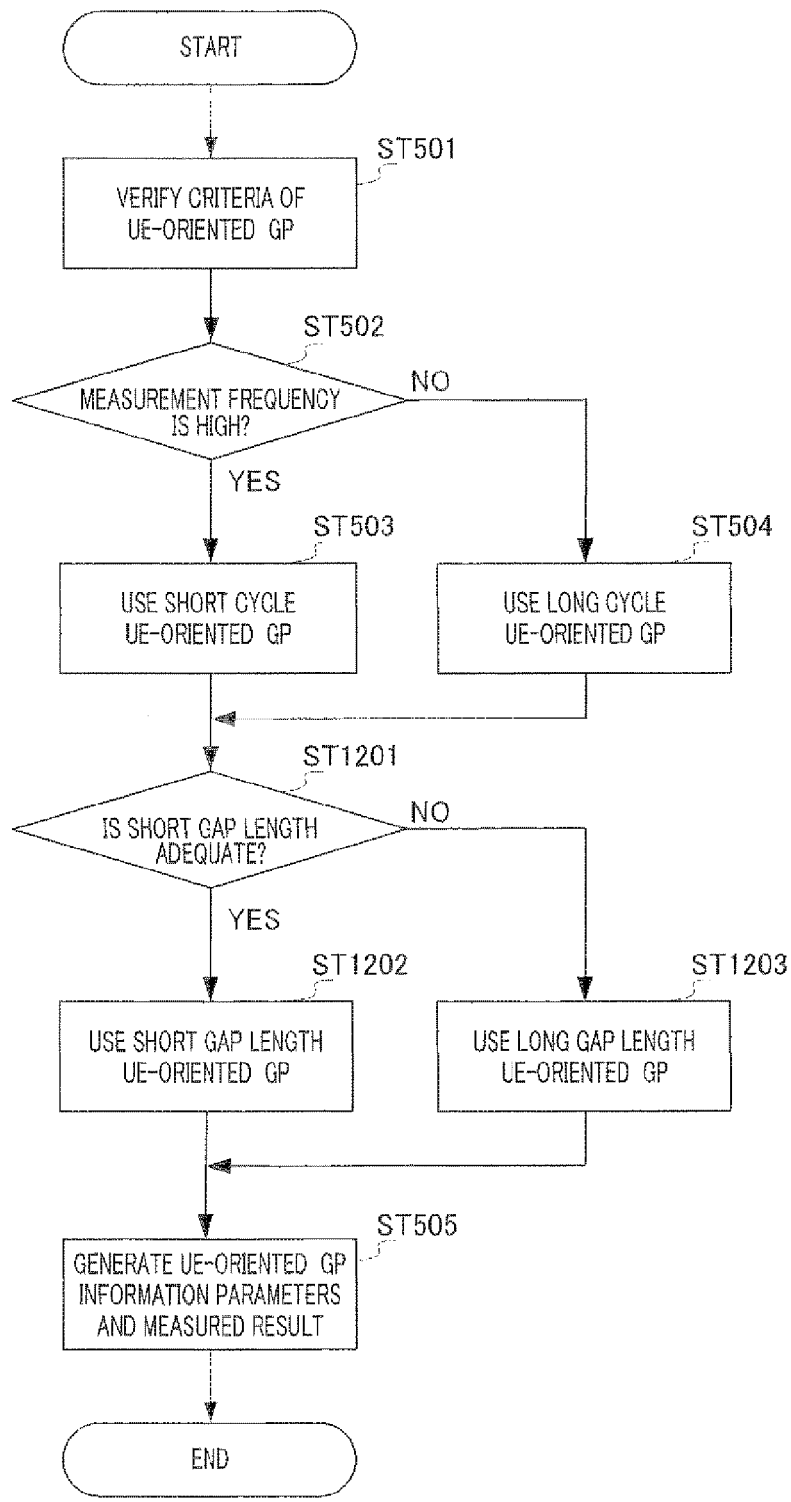
FIG. 17 is a flow diagram showing operation of a measurement and gap information generating section shown in FIG. 15.

FIG. 17 is a flow diagram showing operation of measurement and gap information generating section 1101 shown in FIG. 15. In FIG. 17, the same components of FIG. 6 will be assigned the same reference numerals in FIG. 6 and their explanations will be omitted. In FIG. 17, in ST 1201, based on the configured measurement type provided by base station 200, whether or not a short gap length is adequate for the gap length of UE-oriented GP is determined. When the measurement types, such as inter-frequency E-UTRA, inter-RAT UTRAN, inter-RAT GERAN or inter-RAT CDMA 2000 are provided and a short gap length is adequate (YES), the step moves to ST 1202. Meanwhile, when the measurement type such as WiMAX is provided and a long gap length is adequate (NO), the step moves to ST 1203.

In ST 1202, UE-oriented GP adopts a short gap length.

In ST 1203, UE-oriented GP adopts a long gap length.

According to embodiment 5, even when the different time required to measure for each measurement type by deciding a gap length depending on a measurement type, it is possible to measure by using a gap length with an adequate length, so that it is possible to resolve excess and deficiency of a gap length with respect to the time required for measurement and to shorten the time required to perform a handover.

It is equally possible to use ACK of HARQ (Hybrid Auto Repeat reQuest) to a reporting success notice signal according to the above embodiments.

(Embodiment 6)

Figure 18:
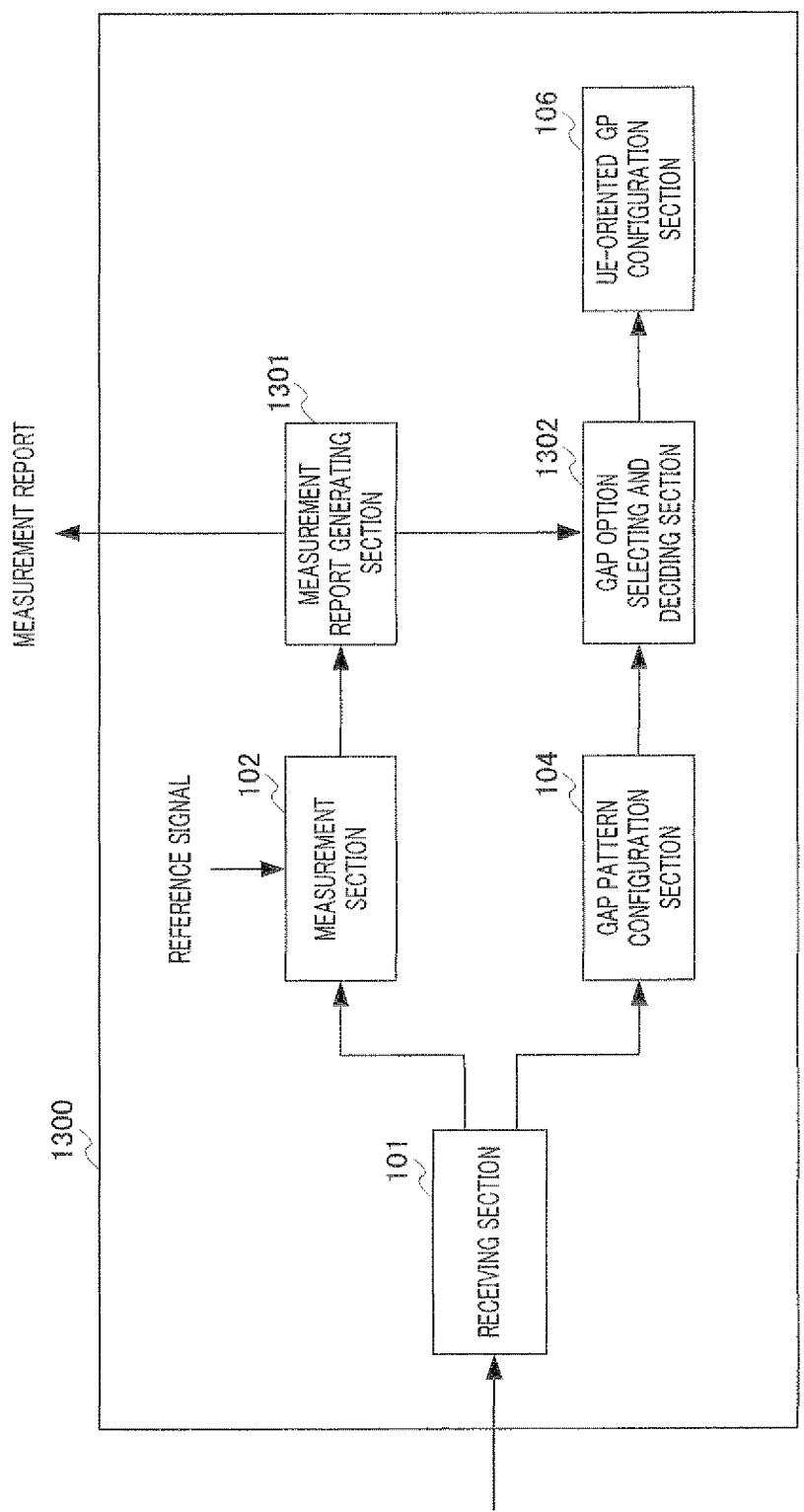
FIG. 18 is a block diagram showing a configuration of UE according to embodiment 6 of the present invention.

Embodiment 6 of the present invention shows the method for UE to generate gaps in a different way from the above embodiments. FIG. 18 is a block diagram showing a configuration of UE 1300 according to embodiment 6 of the present invention. FIG. 18 differs from FIG. 1 in that measurement report generating section 103 is changed to measurement report generating section 1301, and gap verification section 105 is changed to gap option selecting and deciding section 1302.

Measurement report generating section 1301 differs from measurement report generating section 103 in the points to remove a reporting success notice signal that is an input to measurement report generating section 103, and to be a reporting performance notice signal as an input to gap option selecting and deciding section 1302, instead of a reporting success notice signal.

Gap option selecting and deciding section 1302 decides the position to start UE-oriented GP, based on gap pattern parameters output from gap pattern configuration section 104 and a reporting performance notice signal output from measurement report generating section 1301. This starting position is the position to start gaps where UE 1300 performs measurement. Unlike gap verification section 105, gap option selecting and deciding section 1302 decides the position to start UE-oriented GP by using UE-oriented GP generating timing that is provided in UE. In the present embodiment, this UE-oriented GP generating timing that is provided in LIE is included in the gap pattern parameters output from gap pattern configuration section 104. Specifically, the UE-oriented GP generating timing is expressly shown with a system frame number (hereinafter "SFN") or a subframe, and shown, for example, as from subframe 5 of SFN that is SFN mod 10=3. The control of a gap length and gap repetition is decided as in gap verification section 105.

Figure 19:
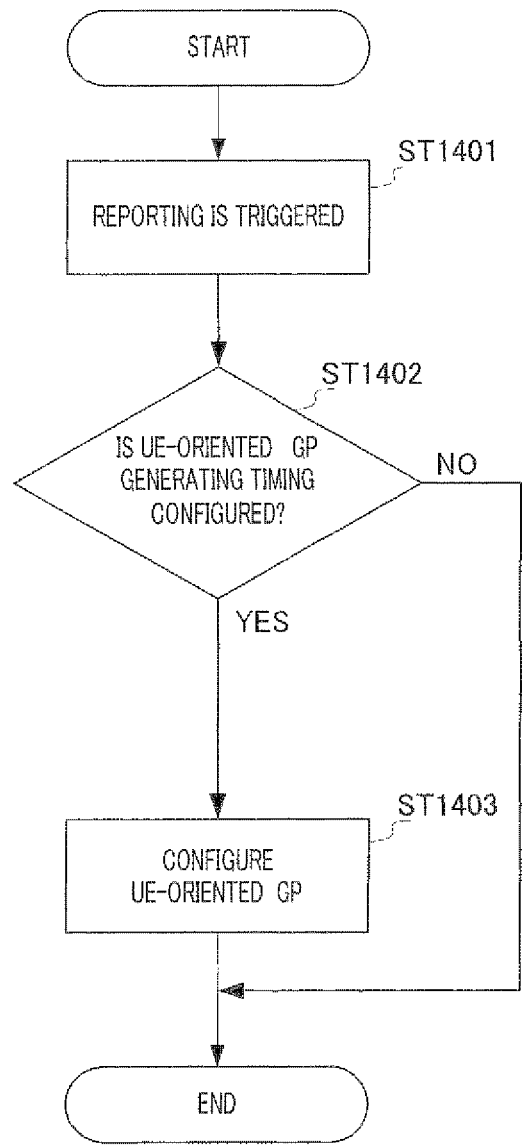
FIG. 19 is a flow diagram shows operation of UE shown in FIG. 18.

FIG. 19 is a flow diagram showing operation of UE 1300 shown in FIG. 18. In this diagram, in ST 1401, the even where measurement report generating section 1301 transmits a measurement report to a base station is triggered. As a result, a reporting is also triggered.

In ST 1402, according to a reporting performance notice signal from measurement report generating section 1301, gap option selecting and deciding section 1302 verifies whether or not UE-oriented GP generating timing is provided. When UE-oriented GP generating timing is provided (YES), the step moves to ST 1403, and when UE-oriented GP generating timing is not provided (NO), since UE-oriented GP cannot be generated, the process ends.

In ST 1403, gap option selecting and deciding section 1302 decides the next UE-oriented GP generating timing as the position for UE-oriented GP.

Figure 20:
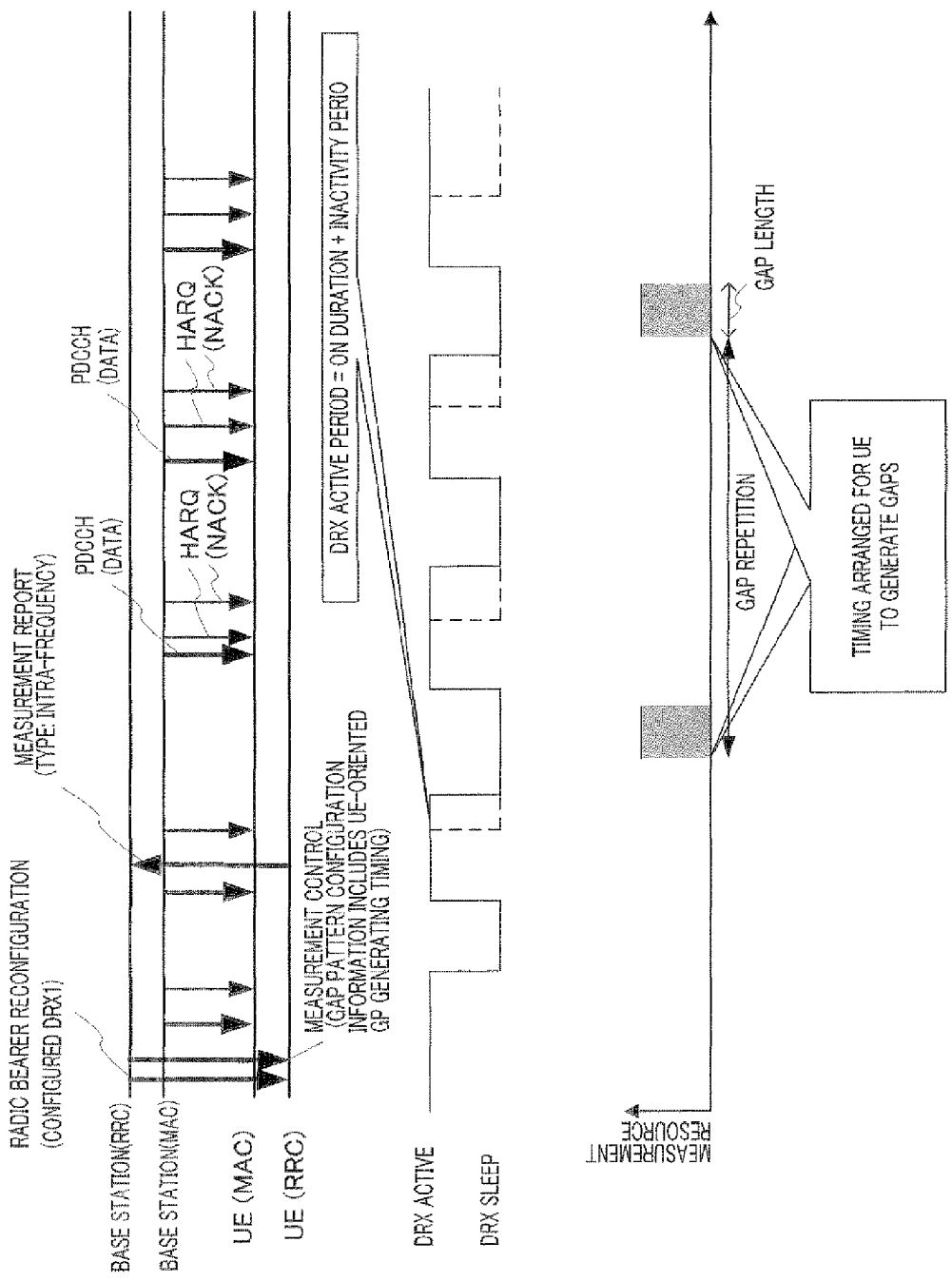
FIG. 20 shows a signaling flow of UE shown in FIG. 18.

FIG. 20 shows a signaling flow of UE 1300 shown in FIG. 18. At first, a base station provides gap pattern configuration information and measurement configuration information. A base station transmits these configuration information to UE 1300. UE 1300 receives and processes the configuration information transmitted from a base station. Here, the different point from FIG. 3 is to receive UE-oriented GP generating timing as gap pattern configuration information.

When an idle period to measure other carrier frequencies or to receive from other cells, UE 1300 decides UE-oriented GP from the UE-oriented GP generating timing received from a base station. UE 1300 also transmits a measurement report to a base station.

In FIG. 20, although UE-oriented GP is generated after transmitting a measurement report, it is equally possible for UE-oriented GP to start first.

In the present embodiment, the transmission of a measurement report is not a prerequisite to generate UE-oriented GP. Thus, it is possible not to transmit a measurement report. As explained in embodiment 1, as the events for reporting, there are, for example, "the quality of serving carrier frequency is lower than a specific threshold" and "a CSG cell is detected, so that this requires to receive broadcast information of a CSG cell." Especially, when "a CSG cell is detected, so that this requires to receive broadcast information of a CSG cell," reporting is not performed first, but it is possible to receive broadcast information of a CSG cell, and perform a reporting after receiving, for example, the cell global identifier (CGI) of this CSG cell or the CSG identifier (CSG ID). This is because the information such as CGI or CSG ID is necessary to identify whether or not it is possible for UE to access to the CSG cell, or which cell is actually possible to access.

Furthermore, when a number of CSG cells are provided, it is possible to generate a plurality of UE-oriented GPs, so that UE throughput degradation and service quality deterioration are possible. As a solution, although it is possible to limit the above UE-oriented GP generating timing, in this case there is a problem that it takes time until UE-oriented GP is performed after UE detects a CSG cell. Therefore, it is possible not to limit the UE-oriented GP generating timing, but to limit the frequency to use the UE-oriented GP generating timing. For example, even if the UE-oriented GP generating timing occurs ten times per second, it is possible to limit the usage up to two times, or not to allow the usage for 500 ms if the UE-oriented GP generating timing is used once. Therefore, as an operation to limit the frequency to use the UE-oriented GP generating timing, it is possible for a base station to instruct this configuration to UE, or to perform a preliminarily decided operation.

To receive broadcast information from a CSG cell, it is possible to use a gap of 80 ms once. Therefore, a configuration that a gap length is 80 ms and no gap repetition is always used without notifying a gap length and gap repetition from a base station. When there is no instruction from a base station, an operation, for example, to use this configuration is possible. The reason that a gap of 80 ms is necessary is that, since CGI, broadcast information that includes CSG ID, and system information block type 1 (SIB1) are transmitted to 20 ms at one time, it is possible for UE which reception quality is not good to try to improve the quality by receiving and combining it four times.

Figure 21:
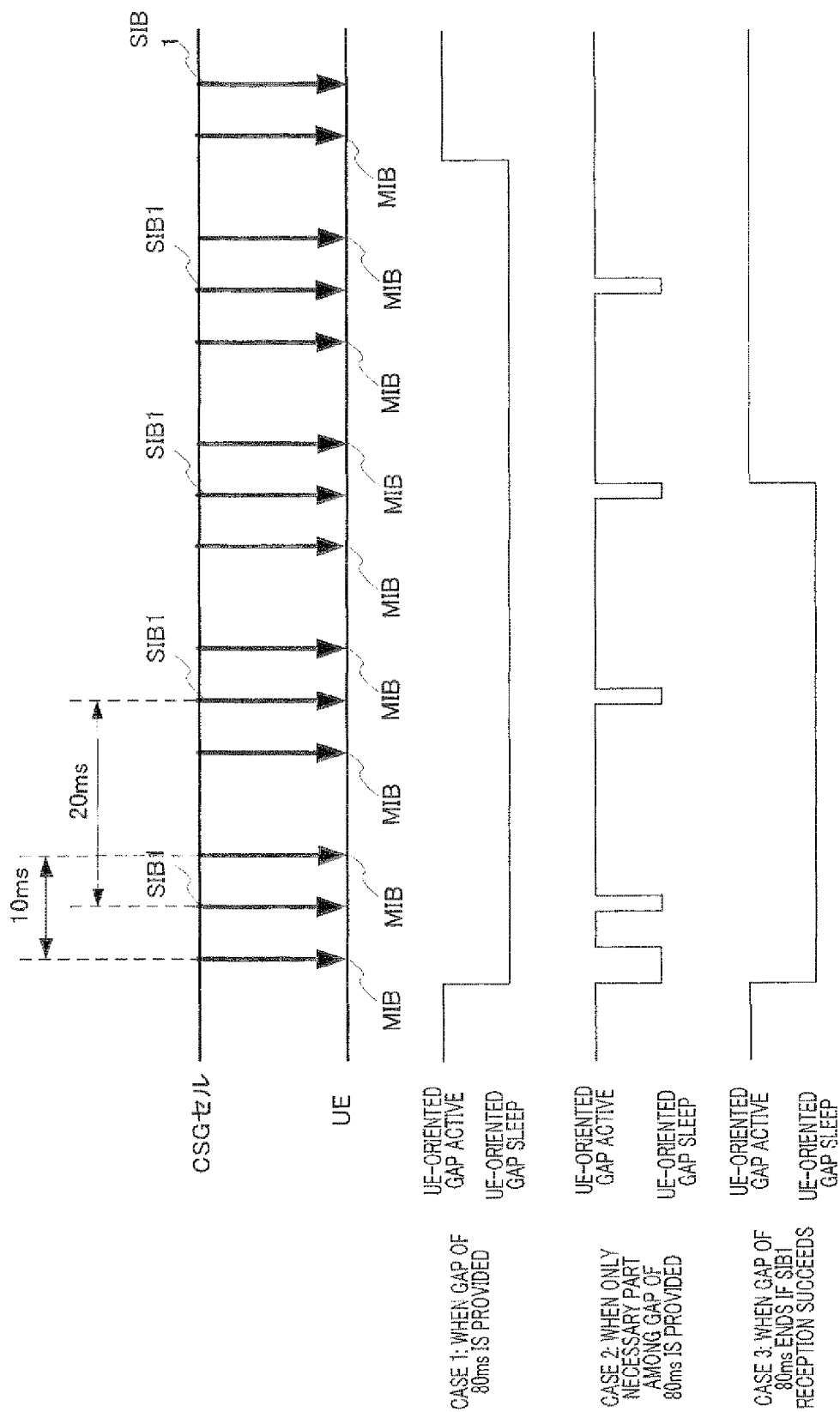
FIG. 21 shows operation of receiving SIB 1.

The above SIB1 receiving operation will be described in detail in FIG. 21. When receiving broadcast information, master information block (MIB) is received at first. The position of MIB is decided as the first subframe in all radio frames (which is 10 ms interval and has 10 subframes). SFN is included in this MIB. SIB1 is transmitted at the sixth subframe of an even-numbered SFN. Thus, the transmitting timing of SIB1 will be found after receiving MIB. As mentioned above, since it may be necessary to receive and combine four times to receive SIB1 accurately, it is possible to provide a gap of 80 ms as shown in case 1 in FIG. 21. By this means, operations such as receiving MIB, to detect the transmitting timing of SIB1, and then to receive SIB1 until it is received successfully.

However, once MIB is received from a CSG cell, UE comes to see at which timing a CSG cell transmits SIB1. Therefore, as shown in case 2, it is possible to provide gaps only for necessary parts in a gap of 80 ms. In this case, in a place where there is no gap, UE can transmit and receive with a base station where UE is originally connected.

Furthermore, as other operations, as shown in case 3, it is possible to finish gaps when the reception of SIB1 succeeds. FIG. 21 shows an example where SIB1 reception succeeds at the third time. An operation that combines case 2 and case 3 of FIG. 21 is also possible.

Even if UE does not perform DRX, the present invention is possible to perform UE-oriented GP. This is because the position for UE to start UE-oriented GP is predictable for a base station regardless of an DRX operation.

In order for a base station to decide whether or not UE performs UE-oriented GP, it is possible to use a measurement report transmitted from UE, as shown in embodiment 1. As a measurement report here, it is possible to be a measurement report message that is defined as an RRC message as described above, a MAC control message, or a message in layer 1. Furthermore, as a message in layer 1, for example, CQI reporting is possible.

In the present embodiment, as shown in FIG. 20, a case to transmit measurement control information for each UE, and to show the UE-oriented GP generating timing in the information has been explained. However, as other examples, the operations such as transmitting via broadcast information or deciding a rule in advance are possible.

It is equally possible to decide the UE-oriented GP generating timing by using an identifier arranged for each UE. For example, in chapter 7 of TS36.304V8.5.0, User Equipment (UE) procedure in idle mode, the method to decide the timing for UE to receive paging by using an identifier called international mode subscriber identity (IMSI). When determining by using an identifier of UE in this way, even by using broadcasting information and a specific rule, it will be possible to designate a different place as the UE-oriented GP generating timing for each UE. As an identifier of UE to use, it is not limited to IMSI, and it is possible to use, for example, C-RNTI (Cell Radio Network Temporary Identifier) and S-TMSI (SAE Temporary Mobile Station Identifier).

Furthermore, it is also possible to control on and off of the present operation for each UE or cell, when transmitting a configuration via broadcast information or deciding a rule in advance. Specifically, when controlling for each UE, it is possible to notify on or off by an individual message, and when controlling for each cell, it is possible to notify on or off by broadcast information.

Furthermore, in the above embodiment, it is shown that a CSG cell is detected, but a plurality of forms are possible for this. Specifically, (1) when the physical cell identifier of a cell that is decided to be used for CSG is detected; (2) when the physical cell identifier of a cell that is decided to be used for CSG is detected, and the quality of this CSG cell is above a certain level or included within the above specific numbers; (3) when the physical cell identifier of a cell that is decided to be used for CSG is detected, and the physical cell identifier of the cell seems to be accessible for UE; (4) when from, for example, position information of UE, it is possible to assume that there is a CSG cell; and when combining (1)~(4) are possible. Furthermore, to assume that there is a CSG cell from, for example, position information of UE is an operation where UE saves the position information at the time when UE connected to a CSG cell before, and when UE comes close around the area, UE identifies that there is an accessible CSG cell. Here, it is equally possible, for example, to use global positioning system (GPS) to generate position information, and to save other cells information that UE can receive.

Furthermore, it is also possible for the UE-oriented GP generation shown in the present embodiment to be cancelled or extended due to for example, competition of other operations. For example, there is a scheduling method called semi-persistent scheduling, for a service to transmit on a regular basis at comparatively a small data rate as voice communication. This is the method to decide in advance at which timing UE transmits or receives and to perform transmission and reception at the timing. When this semi-persistent scheduling is provided in UE and the UE-oriented GP generation is performed, if both happens at the same time, it is necessary to prioritize one of these. In that case, for example, it is possible to prioritize the semi-persistent scheduling.

Furthermore, as a method to solve a problem that the semi-persistent scheduling and UE-oriented GP generation collide, it is possible to set the semi-persistent scheduling at the timing when UE-oriented GP is not generated. It is possible to realize this, for example, by scheduling operation of a base station.

In the present embodiment, although it has been described that it is possible not to transmit a measurement report, it is equally possible to decide whether or not to transmit a measurement report based on the delay to generate UE-oriented GP. Specifically, when it is possible to generate UE-oriented GP within a specific time, it is possible not to transmit a measurement report, and when it exceeds the specific time, it is possible to transmit a measurement report and to promote a base station to arrange gaps. As the specific time mentioned here, it is equally possible to de decided as the fixed value by a system, to notify by, for example, broadcast information, or to transmit to each UE for consideration of, for example, services that UE uses.

It is possible to realize by combining the operations shown in each embodiment above. Specifically, it is possible to identify to transmit a measurement report shown in embodiment 6 by using transmitting criteria shown in embodiment 4.

Each embodiment mentioned above explains an example when the present invention is performed by hardware, but the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2009-101958, filed on Apr. 20, 2009, and Japanese Patent Application No. 2009-149876, filed on Jun. 24, 2009, including the specifications, drawings and abstracts, are incorporated herein by reference in their entirety.

Industrial Applicability

It is possible to apply a radio communication terminal apparatus, radio communication base station apparatus, and radio communication method of the present invention to, for example, a mobile communication system.

REFERENCE SIGNS LIST

101 RECEIVING SECTION
102 MEASUREMENT SECTION
103, 1301 MEASUREMENT REPORT GENERATING SECTION
104, 202 GAP PATTERN CONFIGURATION SECTION
105 GAP VERIFICATION SECTION
106 UE-ORIENTED GP CONFIGURATION SECTION
201 MEASUREMENT CONFIGURATION SECTION
203 DEDICATED SIGNAL GENERATING SECTION
204 TRANSMITTING SECTION
401, 901 MEASUREMENT AND GAP INFORMATION GENERATING SECTION
601 MEASUREMENT AND UE-ORIENTED GP INFORMATION GENERATING SECTION
602 UE-ORIENTED GP VERIFICATION SECTION
902 GAP ADJUSTED VERIFICATION SECTION
1101 MEASUREMENT AND GAP INFORMATION GENERATING SECTION
1302 GAP OPTION SELECTING AND DECIDING SECTION

The invention claimed is:

1. A radio communication terminal apparatus comprising:
a gap verification section that is structured to decide whether to start a gap pattern in a current discontinuous reception (DRX) cycle or to start the gap pattern in a next(DRX) cycle, based on a DRX active period to receive data and a length of an offset that shows a time from a start of the DRX active period to a start of the gap pattern; and
a gap pattern configuration section that is structured to generate the gap pattern in a the decided DRX cycle,
wherein:
the gap verification section is structured to decide to start the gap pattern in the current DRX cycle when the DRX active period ends before the offset, and to decide to start the gap pattern in the next DRX cycle when the DRX active period ends after the offset.

2. The radio communication terminal apparatus according to claim 1, further comprising a gap information generating section structured to, by controlling a cycle of a gap pattern according to reception condition in the radio communication terminal apparatus, control how often to measure a frequency in a neighbor cell that is different from a serving cell, and notifies a controlled cycle of the gap pattern to a radio communication base station apparatus in the serving cell.

3. The radio communication terminal apparatus according to claim 1, wherein the gap verification section is structured to decide the DRX cycle to start the gap pattern based on the DRX active period and gap pattern period parameters that include a time required for channel quality indicator reporting from the radio communication terminal apparatus.

4. The radio communication terminal apparatus according to claim 1, wherein the gap verification section is structured to decide to start the gap pattern when radio quality of a serving cell is lower than a predetermined threshold.

5. The radio communication terminal apparatus according to claim 2, wherein the gap information generating section is structured to decide a gap length of the gap pattern according to a measurement type that shows a system, frequency or cells of a measurement target.

6. A radio communication method comprising:
deciding, by a controller, whether to start a gap pattern in a current discontinuous reception (DRX) cycle or to start the gap pattern in a next DRX cycle, based on a DRX active period to receive data and a length of an offset that shows a time from a start of the DRX active period to a start of the gap pattern; and
generating the gap pattern in the decided DRX cycle,
wherein:
the deciding of the DRX in which the gap pattern is started comprises deciding to start the gap pattern in the current DRX cycle when the DRX active period ends before the offset, and deciding to start the gap pattern in the next DRX cycle when the DRX active period ends after the offset.

* * * * *